United States Patent
Fukumoto et al.

[19]

[11] Patent Number: 5,892,944
[45] Date of Patent: Apr. 6, 1999

[54] PROGRAM EXECUTION AND OPERATION RIGHT MANAGEMENT SYSTEM SUITABLE FOR SINGLE VIRTUAL MEMORY SCHEME

[75] Inventors: Atsushi Fukumoto, Kanagawa-ken; Toshinari Takahashi; Toshio Okamoto, both of Tokyo; Hideki Yoshida, Kanagawa-ken; Sung Ho Shin, Tokyo, all of Japan

[73] Assignee: Kabushiki Kaisha Toshiba, Kawasaki, Japan

[21] Appl. No.: 779,118

[22] Filed: Jan. 6, 1997

Related U.S. Application Data

[63] Continuation of Ser. No. 278,066, Jul. 20, 1994, abandoned.

[30] Foreign Application Priority Data

Jul. 20, 1993 [JP] Japan .................................. 5-178637
Dec. 28, 1993 [JP] Japan .................................. 5-349335

[51] Int. Cl.⁶ .................................................. G06F 9/40
[52] U.S. Cl. .......................... 395/670; 395/671; 395/672; 395/673; 395/676
[58] Field of Search .................. 395/670, 671, 395/673, 674, 676, 672

[56] References Cited

U.S. PATENT DOCUMENTS

| | | | |
|---|---|---|---|
| 5,050,070 | 9/1991 | Chastain et al. | 395/375 |
| 5,247,675 | 9/1993 | Farrell et al. | 395/650 |
| 5,261,097 | 11/1993 | Saxon | 395/650 |
| 5,313,647 | 5/1994 | Kaufman et al. | 395/700 |
| 5,319,782 | 6/1994 | Goldberg et al. | 395/650 |
| 5,446,899 | 8/1995 | Brett | 395/700 |
| 5,455,949 | 10/1995 | Conder et al. | 395/700 |

OTHER PUBLICATIONS

Okamoto et al., "A Micro Kernel Architecture For Next Generation Processors", *Micro–Kernels and other Kernel Architectures*, pp. 83–94, (1992).

Rashid et al., "Machine–Independent Virtual Memory Management For Paged Uniprocessor And Multiprocessor Architectures", *Carnegie Mellon University*, CMU–CS–87–140, (1987).

*Primary Examiner*—Krisna Lim
*Assistant Examiner*—Saleh Najjar
*Attorney, Agent, or Firm*—Foley & Lardner

[57] ABSTRACT

A program execution and operation right management system capable of providing flexible and sufficient protection uniformly even for the thread operation instructions among the threads sharing the same virtual address space and/or for individual memory region. In the system, operation right data indicating which thread can be operated by which thread among a plurality of threads are stored, and whether a thread operation with respect to one thread requested by another thread among a plurality of threads is allowed by the operation right data is judged. Then, the processor is allowed to carry out said thread operation with respect to that one thread by that another thread only when it is judged that said thread operation is allowed by the operation right data.

20 Claims, 22 Drawing Sheets

FIG.12A

| THREAD ID | SEGMENT ID |
|---|---|
| 1 | 101 |
| 2 | 102 |
| 3 | 103 |
| 4 | 104 |

FIG.12B

| OPERATION THREAD ID | TARGET SEGMENT ID | OPERATION SEGMENT ID | MEMORY ACCESS RIGHTS | | |
|---|---|---|---|---|---|
| | | | R | W | X |
| 1 | 102 | all | ○ | ○ | × |
| 1 | 103 | all | × | × | ○ |
| 2 | 101 | all | × | × | ○ |
| 3 | 101 | all | ○ | ○ | ○ |

FIG.19

| OPERATION THREAD ID | TARGET THREAD ID | OPERATION THREAD MEMORY REGION ID | THREAD OPERATION RIGHTS ||| THREAD OPERATION RIGHT CHANGING RIGHT |
| --- | --- | --- | --- | --- | --- | --- |
| | | | THREAD INTERNAL STATUS READING RIGHT | THREAD INTERNAL STATUS CHANGING RIGHT | THREAD EXECUTION STOP/START RIGHT | |
| 1 | 2 | all | ○ | ○ | × | × |
| 1 | 3 | all | × | × | ○ | × |
| 2 | 1 | all | × | × | ○ | × |
| 3 | 1 | A | ○ | ○ | ○ | ○ |
| 100 | 2 | all | ○ | × | × | ○ |
| 3 | 2 | A | ○ | × | ○ | × |

| OPERATION THREAD ID | TARGET THREAD ID | OPERATION THREAD MEMORY REGION ID | THREAD OPERATION RIGHTS ||| THREAD OPERATION RIGHT CHANGING RIGHT |
|---|---|---|---|---|---|---|
| | | | THREAD INTERNAL STATUS READING RIGHT | THREAD INTERNAL STATUS CHANGING RIGHT | THREAD EXECUTION STOP/START RIGHT | |
| 11 | 10 | all | ○ | × | × | ○ |

| OPERATION THREAD ID | TARGET MEMORY REGION ID | OPERATION THREAD MEMORY REGION ID | MEMORY REGION OPERATION RIGHTS ||| MEMORY REGION OPERATION RIGHT CHANGING RIGHT |
|---|---|---|---|---|---|---|
| | | | MEMORY REGION INTERNAL DATA READING RIGHT | MEMORY REGION INTERNAL DATA CHANGING RIGHT | MEMORY REGION PROGRAM EXECUTION RIGHT | |
| 10 | 30 | all | ○ | ○ | × | ○ |

FIG.22

Table 70A-2:

| OPERATION THREAD ID | TARGET THREAD ID | OPERATION THREAD MEMORY REGION ID | THREAD OPERATION RIGHTS ||||
|---|---|---|---|---|---|---|
| | | | THREAD INTERNAL STATUS READING RIGHT | THREAD INTERNAL STATUS CHANGING RIGHT | THREAD EXECUTION STOP/START RIGHT | THREAD OPERATION RIGHT CHANGING RIGHT |
| 11 | 10 | all | ○ | × | × | ○ |
| 10 | 12 | all | ○ | ○ | ○ | ○ |
| 10 | 13 | all | ○ | ○ | ○ | ○ |

FIG.23

Table 70B-2:

| OPERATION THREAD ID | TARGET MEMORY REGION ID | OPERATION THREAD MEMORY REGION ID | MEMORY REGION OPERATION RIGHTS ||||
|---|---|---|---|---|---|---|
| | | | MEMORY REGION INTERNAL DATA READING RIGHT | MEMORY REGION INTERNAL DATA CHANGING RIGHT | MEMORY REGION PROGRAM EXECUTION RIGHT | MEMORY REGION OPERATION RIGHT CHANGING RIGHT |
| 10 | 30 | all | ○ | ○ | × | ○ |
| 12 | 30 | all | ○ | ○ | × | × |
| 13 | 30 | all | ○ | ○ | × | × |

| OPERATION THREAD ID | TARGET THREAD ID | OPERATION THREAD MEMORY REGION ID | THREAD OPERATION RIGHTS ||||
|---|---|---|---|---|---|---|
| | | | THREAD INTERNAL STATUS READING RIGHT | THREAD INTERNAL STATUS CHANGING RIGHT | THREAD EXECUTION STOP/START RIGHT | THREAD OPERATION RIGHT CHANGING RIGHT |
| 12 | 13 | all | ○ | ○ | ○ | ○ |

| OPERATION THREAD ID | TARGET MEMORY REGION ID | OPERATION THREAD MEMORY REGION ID | MEMORY REGION OPERATION RIGHTS ||||
|---|---|---|---|---|---|---|
| | | | MEMORY REGION INTERNAL DATA READING RIGHT | MEMORY REGION INTERNAL DATA CHANGING RIGHT | MEMORY REGION PROGRAM EXECUTION RIGHT | MEMORY REGION OPERATION RIGHT CHANGING RIGHT |
| 12 | 30 | all | ○ | ○ | × | ○ |
| 13 | 30 | all | ○ | ○ | × | × |

PROGRAM EXECUTION AND OPERATION RIGHT MANAGEMENT SYSTEM SUITABLE FOR SINGLE VIRTUAL MEMORY SCHEME

This application is a continuation of application Ser. No. 08/278,066, filed Jul. 20, 1994, now abandoned.

BACKGROUND OF THE INVENTION

1. Field of the Invention

The present invention relates to a system for managing the execution of program executing threads as well as operation rights for the memory regions and/or threads in a computer. It is to be noted here that, in the following description, the thread or memory region operation refers to a manipulation of a thread or a memory region, and the operation right for a thread or a memory region refers to a right for manipulating the thread or the memory region.

2. Description of the Background Art

In recent years, due to the improvement of the microprocessor performance, it has become commonplace to use a plurality of small size computers connected by a network. As a result, the cooperative work among the computers connected by the network or their users become possible, and there arose a need for managing the operation rights strictly.

In addition, due to the advance of the object oriented techniques and the appearance of the new paradigm such as a server client model, it is becoming increasingly difficult to achieve sufficient performance by the conventional operation right management in units of memory devices or files.

In order to resolve these problems, there has been an attempt to design an operating system in which the memory devices such as memory elements, CD-ROMs, and hard-disk drives as well as all the other computer resources such as the display and the keyboard can be managed under the identical concept, using the technique such as that of the single virtual memory. In particular, the technique of the single virtual memory for arranging various resources on the identical virtual space is noteworthy. There is also a proposition for managing the operation rights in units of blocks by dividing this single virtual memory into a number of blocks. This unit of management is called a memory region, and it is used as a unit for managing operation rights for all kinds of memory devices.

On the other hand, due to the enhanced utilization range of the microprocessor, it is becoming necessary for the operating system (OS) to be capable of dealing with various application fields, so that the OS is required to take a flexible structure. In this regard, there has been a conventional scheme to use a plurality of OSs interchangeably according to the utilization purposes or the hardware types. There has also been a technique of the micro-kernelized OS in which the minimum indispensable functions alone are given to the micro-kernel while all the other functions are provided as the user programs external to the micro-kernel, so as to be able to cover the wide range of utilization purposes by a single OS. In this technique, it becomes possible to provide the OS functions of a plurality of conventional OSs on a single micro-kernel in forms of the user programs, so that it is possible to realize the OS in the flexible structure.

In such a micro-kernelized OS, a control unit called process or thread is usually employed as the control as the unit of program execution management. Each thread has processor register values and stacks independently, and executes the program when the OS allocates the processor to this thread. The OS releases the allocation of the processor to one thread and allocates the processor to another thread after a certain period or time, or when a hardware interruption occurs. Since each thread has independent register states, it can be virtually regarded as a parallel processing processor.

In this type of the OS, the computer resources are constituted in units of two concepts called memory regions and threads, and the management of the operation rights to these memory regions and threads is made according to the data in the form of ACL (Access Control List) which is attached to each of the memory regions and threads.

For example, for a case of manipulating the thread itself on such an OS, i.e., when the execution of the thread is to be stopped or re-started, or when the thread is to be extinguished forcefully, or else when the internal states of the thread such as its register values or the stacks are to be examined, the OS provides a group of thread operation instructions such that it is possible to operate on one thread from the other thread. Such a thread operation instruction is provided to the user programs as a means of system call.

When such thread operation instructions are provided, if every thread is allowed to issue any of these thread operation instructions freely, it is going to allow even an illegal operation as well, so that there is a need to provide some protection mechanism. For instance, it is necessary to provide a protection mechanism such that the forceful extinguishing of a thread is allowed only to such a thread which has a particular right.

In addition, in the case of a system such as the Mach operating system disclosed by R. Rashid, et al. in "Machine-Independent Virtual Memory Management for Paged Uniprocessor and Multiprocessor Architectures", CMU-CS-87140, Carnegie Mellon University, July 1987, in which a plurality of virtual spaces are provided and one program or data is arranged in each of these virtual spaces, the thread can move only within each virtual space, the identical protection is provided for all the threads present in the same virtual space, and the protection of the threads relies on the protection of the memory spaces. In this case, however, it has been impossible to protect each thread separately. Also, in a case of a system such as the single virtual space in which all the programs are arranged within one and the same address space while a plurality of threads are provided, the protection of the threads cannot simply rely on the protection of the memory spaces and there is a need to set up a special right from the OS.

One way to resolve this problem is to specify an owner of each resource such as a thread and the operation of the resource is allowed only to the resources owned by the same owner. This scheme is realized by "signal" in the UNIX operating system as a means of process manipulation for instance. However, in this scheme, the protection among the resources of the same owner lacks flexibility, and it is impossible to give the operation right to the resource of the different owner, or it is impossible to enable the resource operation from the resources of a plurality of different owners, so that the resource protection function for enabling the sufficiently flexible resource operation has been unavailable.

On the other hand, there has been an attempt to increase the flexibility such as the DCE in which the ACL for the file or the directory is attached with various data concerning the data addition or deletion right, the ACL changing right, etc., so as to enable the multifarious settings of operation rights for the data files. However, such an attempt still lacks the flexibility for enabling a plurality of owners to manage the ACL of the memory region for example.

In addition, as for the right to change the operation rights themselves with respect to the thread, it has only been possible to make a rather simple management in which it is permitted only to the owner of the thread, or to a special user called root. Similarly, as for the right to change the operation rights themselves with respect to the memory region, it has only been possible to make a rather simple management in which it is permitted only to the owner of the memory region, or to a special user called root.

Moreover, even if it becomes possible to describe the operation rights with respect to the threads or the memory regions as well as the rights to change these operation rights in a very flexible manner, there arises a problem that the management can be quite complicated in such a case as it is expected that the amount of data required for the protection of the threads or the memory regions increases considerably.

Thus, in the conventional resource management mechanism, the setting of the operation rights has been not sufficiently flexible, or the protection among the threads sharing the identical virtual address space has been either missing or severely restricted.

SUMMARY OF THE INVENTION

It is therefore an object of the present invention to provide a program execution and operation right management system capable of providing flexible and sufficient protection uniformly, not just among the resources in different virtual spaces, but also for the resource operation instructions among the threads sharing the same virtual address space and/or for individual memory region.

According to one aspect of the present invention there is provided a program execution and operation right management system, comprising: processor means for executing programs by executing a plurality of threads concurrently; memory means for storing operation right data indicating which thread can be operated by which thread among said plurality of threads; and management means for judging whether a thread operation with respect to one thread requested by another thread among said plurality of threads is allowed by the operation right data stored by the memory means, and allowing the processor means to carry out said thread operation with respect to said one thread by said another thread only when it is judged that said thread operation is allowed by the operation right data.

According to another aspect of the present invention there is provided a program execution and operation right management system, comprising: processor means for executing programs by executing a plurality of threads concurrently, where the programs are arranged on a logical address space divided into a plurality of memory regions while thread data of each thread among said plurality of threads are stored in respective one of said plurality of memory regions; memory access management means for storing access control list data indicating which thread can make an access to which memory region among said plurality of memory regions; and memory access control means for judging whether a memory access from a certain thread to a certain memory region is allowed by the access control list data stored by the memory access management means, and allowing the processor means to carry out said memory access from said certain thread to said certain memory region only when it is judged that said memory access is allowed by the access control list data, such that a thread operation corresponding to said memory access with respect to one thread requested by another thread among said plurality of threads is allowed only when it is judged that said memory access is allowed by the access control list data.

According to another aspect of the present invention there is provided a program execution and operation right management system, comprising: processor means for executing programs by executing a plurality of threads concurrently, where the programs to be executed by the processor means are arranged on a logical address space divided into a plurality of memory regions; memory means for storing memory region operation right data indicating which memory region among said plurality of memory regions can be accessed by which thread among said plurality of threads, and memory region operation right changing right data indicating which thread among said plurality of threads can change the memory region operation right data of which memory region among said plurality of memory regions; and management means for judging whether a memory region operation right changing operation with respect to one memory region requested by one thread among said plurality of threads is allowed by the memory region operation right changing right data stored by the memory means, and allowing the processor means to carry out said memory region operation right changing operation with respect to said one memory region by said one thread only when it is judged that said memory region operation right changing operation is allowed by the memory region operation right changing right data.

According to another aspect of the present invention there is provided a method for managing program execution and operation right among a plurality of threads executed concurrently by processor means for executing programs, comprising the steps of: storing operation right data indicating which thread can be operated by which thread among said plurality of threads; judging whether a thread operation with respect to one thread requested by another thread among said plurality of threads is allowed by the operation right data stored at the storing step; and allowing the processor means to carry out said thread operation with respect to said one thread by said another thread only when it is judged that said thread operation is allowed by the operation right data at the judging step.

According to another aspect of the present invention there is provided a method for managing program execution and operation right among a plurality of threads executed concurrently by processor means for executing programs, comprising the steps of: arranging the programs on a logical address space divided into a plurality of memory regions and storing thread data of each thread among said plurality of threads in respective one of said plurality of memory regions; storing access control list data indicating which thread can make an access to which memory region among said plurality of memory regions; judging whether a memory access from a certain thread to a certain memory region is allowed by the access control list data stored at the storing step; and allowing the processor means to carry out said memory access from said certain thread to said certain memory region only when it is judged that said memory access is allowed by the access control list data at the judging step, such that a thread operation corresponding to said memory access with respect to one thread requested by another thread among said plurality of threads is allowed only when it is judged that said memory access is allowed by the access control list data.

According to another aspect of the present invention there is provided a method for managing program execution and operation right among a plurality of memory regions of a logical address space storing programs to be executed by a plurality of threads executed by processor means, comprising the steps of: storing memory region operation right data indicating which memory region among said plurality of memory regions can be accessed by which thread among said plurality of threads, and memory region operation right changing right data indicating which thread among said plurality of threads can change the memory region operation right data of which memory region among said plurality of memory regions; judging whether a memory region operation right changing operation with respect to one memory region requested by one thread among said plurality of threads is allowed by the memory region operation right changing right data stored at the storing step; and allowing the processor means to carry out said memory region operation right changing operation with respect to said one memory region by said one thread only when it is judged that said memory region operation right changing operation is allowed by the memory region operation right changing right data at the judging step.

Other features and advantages of the present invention will become apparent from the following description taken in conjunction with the accompanying drawings.

BRIEF DESCRIPTION OF THE DRAWINGS

FIG. 12A is a table indicating an exemplary allocation of threads to memory segments in the system of FIG. 11.

FIG. 12B is an illustration of an exemplary setting for the TLB used by the memory management unit in the system of FIG. 11.

FIG. 19 is an illustration of the operation right list in the system of FIG. 16, which is obtained by the processing of FIG. 17 on the operation right list of FIG. 15 in another case.

FIG. 20 is an illustration of an exemplary operation right list for threads in the fifth embodiment of the program execution and operation right management system according to the present invention.

FIG. 21 is an illustration of an exemplary operation right list for memory regions in the fifth embodiment of the program execution and operation right management system according to the present invention.

FIG. 22 is an illustration of an exemplary operation right list for threads obtained from the operation right list of FIG. 20.

FIG. 23 is an illustration of an exemplary operation right list for memory regions obtained from the operation right list of FIG. 21.

FIG. 24 is an illustration of an exemplary operation right list for threads obtained from the operation right list of FIG. 22.

FIG. 25 is an illustration of an exemplary operation right list for memory regions obtained from the operation right list of FIG. 23.

DETAILED DESCRIPTION OF THE PREFERRED EMBODIMENTS

Figure 1:
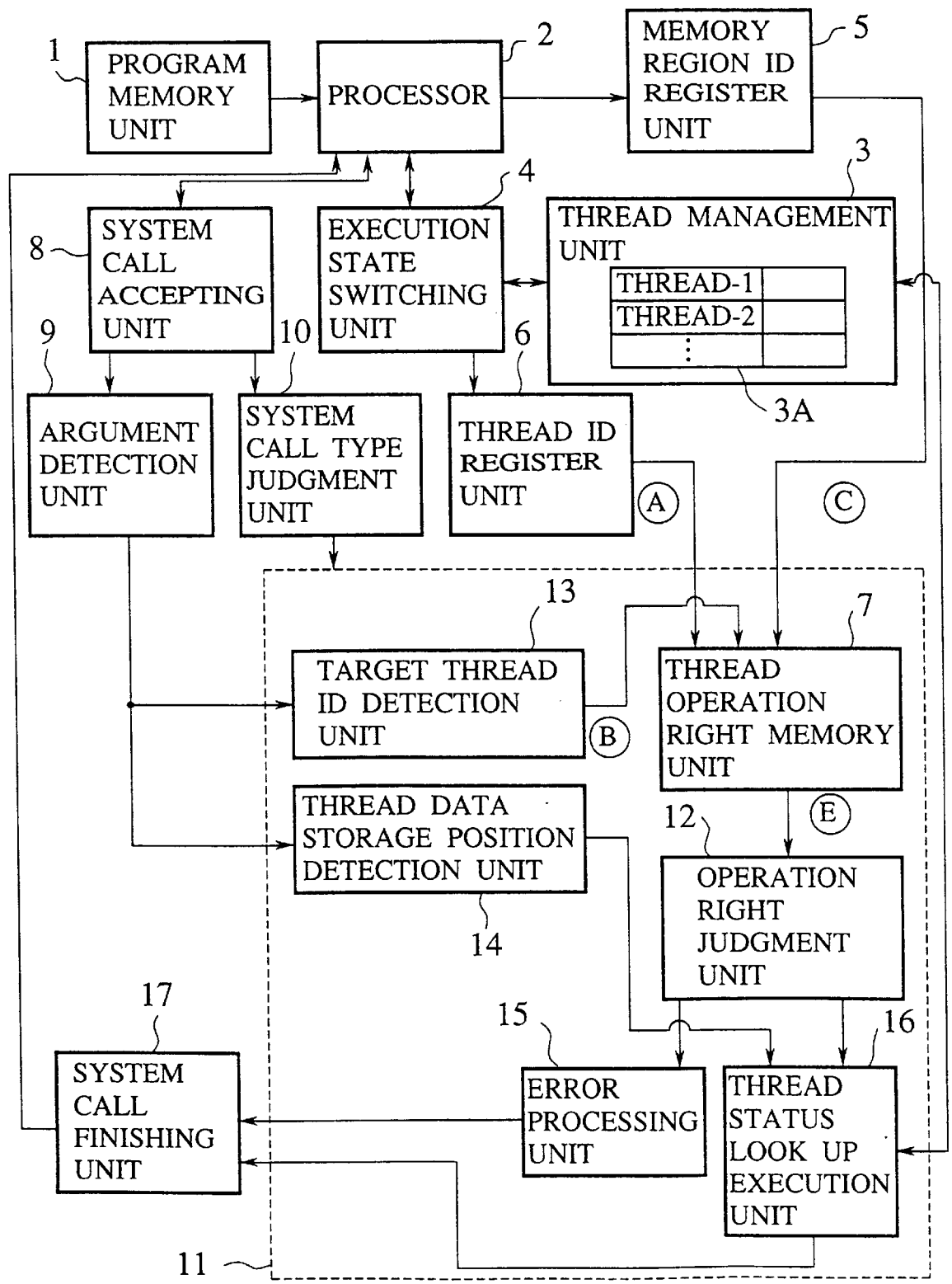
FIG. 1 is a block diagram of a first embodiment of the program execution and operation right management system according to the present invention.

Referring now to FIG. 1, the first embodiment of a program execution and operation right management system according to the present invention will be described in detail.

The program execution and operation right management system of the present invention forms a part of the operating system (OS) which makes the execution control of the computer system as a whole. The OS manages the computer resources such as memories, processors, and peripheral devices, and controls the executions of the programs called user programs which carry out the data processing commanded by the user. Each system has a plurality of user programs in general, and the OS makes the control among these plurality of user programs as well.

The user program is required to issue commands with respect to the OS in order to secure the resources such as the physical memory required for its execution, to input/output the data to the peripheral devices, to transfer the data to the other user programs, to request the processing, or to control the execution. Such a command with respect to the OS is realized by the specialized means called system call. In the following, those system calls which are related to the control of the user program's rights will be described as illustrative examples.

In this first embodiment, the program execution and operation right management system has an overall configuration shown in FIG. 1, in which a program memory unit 1 stores on its memory space the user programs containing instructions to be executed by the computer, the data to be processed, and the data such as the stacks for temporarily storing the intermediate processing results of the computer. The memory space is partitioned into a plurality of regions, and each memory region has a unique identification (ID) for distinguishing it the other memory regions. The programs, data, or stacks are placed in each memory region separately.

A processor 2 is an execution subject for processing data, which interprets and executes the programs stored in the program memory unit 1. A thread management unit 2 manages internal states of the processor 2.

The processor 2 contains various registers to be temporarily utilized during the executions of the instructions such as a program counter (PC) for indicating a location of the currently executed instruction in the program memory unit 1, a stack pointer (SP) for indicating a top position of the stack data, etc., and this processor 2 can carry out the processings of a plurality of different user programs concurrently, in a manner of the time sharing processing, by appropriately interchanging these various data for different user programs. An execution state switching unit 4 carries out a processor execution state switching processing.

Here, a series of data to be used in the processor 2 are collectively referred as a thread, and the time sharing processing can be realized by providing a plurality of threads, switching the thread set to the processor 2 among these plurality of threads, and executing each thread at the processor 2.

A memory region ID register unit 5 holds a memory region ID indicating the memory region in which the currently executed program exists. This memory region ID for the currently executed program can be obtained by utilizing the PC value in the processor 2, and can be effectively regarded as the program ID of the currently executed program as well.

The thread management unit 3 has a thread management table in which the data concerning the registers to be set up in the processor 2 or the other data for management are stored. Here, each thread has a unique thread identifier (thread ID) for distinguishing it from the other threads.

For example, the execution state switching unit 4 interrupts the thread-1 (thread ID=1) currently executed on the processor 2, saves the status of the thread-1 (thread ID=1) in a prescribed position in the thread management table, sets the data of another thread-2 (thread ID=2) into the processor 2 from the thread management table, and re-starts the execution at the processor 2, so as to activate that another thread-2 (thread ID=2) on the processor 2.

The execution state switching unit 4 also sets the thread ID of the currently executed thread in a thread ID register unit B. In addition, the execution state switching unit 4 is further equipped with a thread scheduling mechanism (not shown) for determining which thread is to be executed, and a timer unit (not shown) for specifying when the scheduling should be made.

A thread operation right memory unit 7 has a table concerning the thread protection, which stores the rights to carry out operations with respect to the threads for each thread, which is utilized by an operation right judgement unit 12.

Now, as an example of a system call for enabling some thread currently executing the user program to access the other threads, a case of issuing the "Thread_Get_Status" system call will be described in detail.

This "Thread_Get_Status" system call allows the user program to examine the internal status of the thread specified by the thread ID. Now, suppose the thread-1 (thread ID=1) has tried to obtain the data of the thread-2 (thread ID=2) during the execution of the program-A (memory region ID=A) by using this "Thread_Get_Status" system call. In the program-A written in the C language, this will be described as follows:

err=Thread_Get_Status (2, &Thread_Status)

where the function "Thread_Get_Status" represents the system call for obtaining the data of the thread, in which the first argument "2" indicates the thread-2 whose data are to be obtained while the second argument "&Thread_Status" indicates the position of the memory for storing the data of the thread-2 obtained as result of this system call. Whether the execution of this system call is successful or not is indicated by a return value of this function which is entered into the variable "err".

When this function is executed by the thread-1 of the program-A, the thread-1 makes the transition in the execution level of the processor 2 from the user level to the privileged level by the system call, and calls up the OS. Here, the privileged level is a dedicated level in which the OS carries out the processing.

In the OS so called up, the processing is shifted to a system call accepting unit 8 shown in FIG. 1, which carries out the interruption processing for the user program which called this system call, obtains the type of the system call requested and the arguments specified, and transmits the received arguments and system call type to an argument detection unit 9 and a system call type judgement unit 10 shown in FIG. 1, respectively.

In this exemplary case, the requested system call is the "Thread_Get_Status", so that the system call type judgement unit 10 calls up a "Thread_Get_Status" execution unit 11 shown in FIG. 1.

Figure 2:
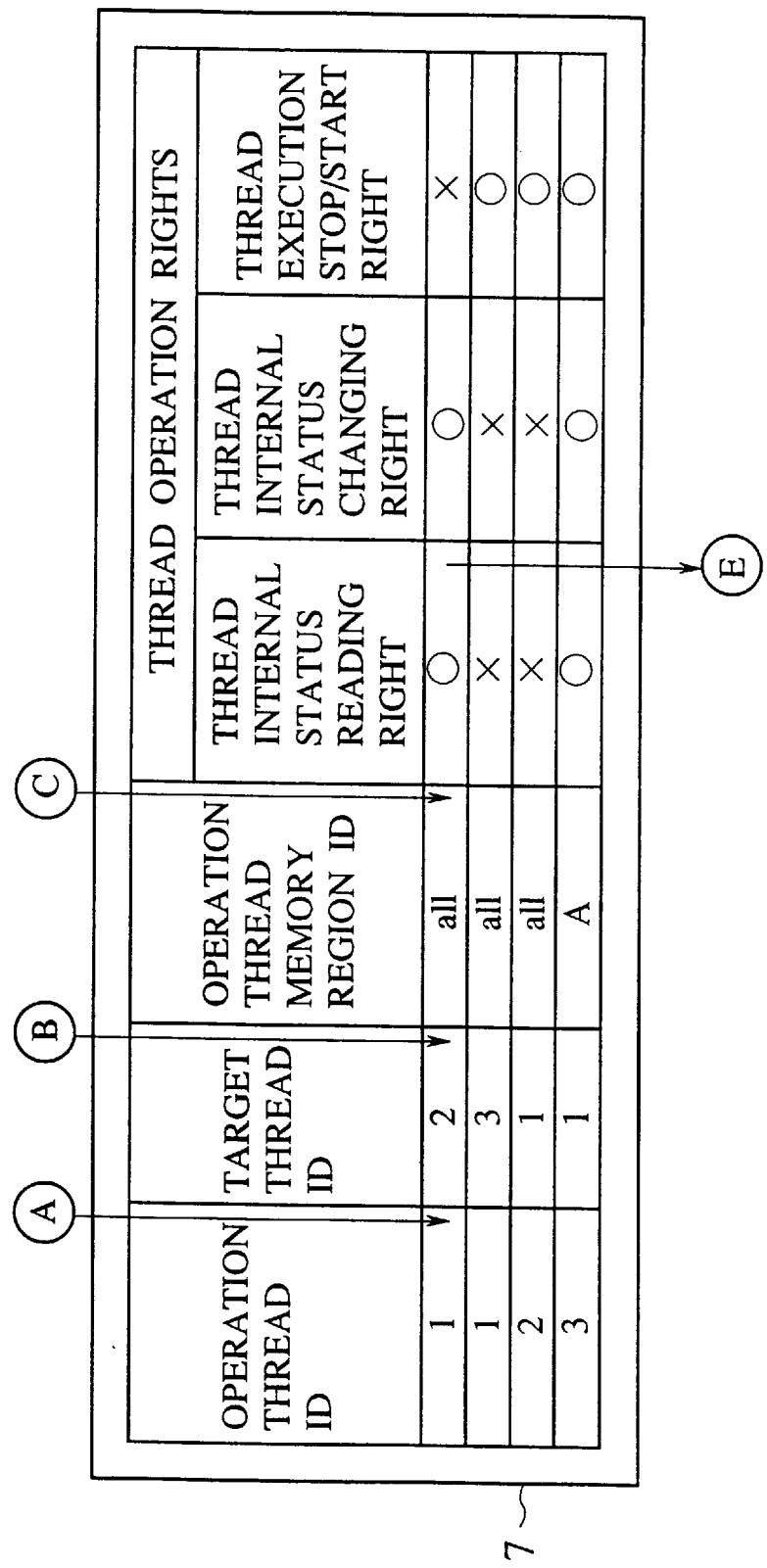
FIG. 2 is an illustration of an exemplary thread operation right table to be used by a thread operation right memory unit in the system of FIG. 1.

This "Thread_Get_Status" execution unit 11 carries out the processing according to a thread operation right table as shown in FIG. 2 which is provided in the thread operation right memory unit 7, where this thread operation right table of FIG. 2 has fields for an operation thread ID indicating a thread ID of an operation thread which is to make an operation, a target thread ID indicating a thread ID of a target thread which is to be operated, an operation thread memory region ID indicating a memory region ID of a memory region at which the operation thread is executing, and various thread operation rights such as a thread internal status reading right, a thread internal status changing right, and a thread execution stop/start right.

Thus, the operation thread ID indicates the thread ID of the thread which is trying to execute this system call for the thread operation, while the target thread ID indicates the thread ID of the operation target specified by the argument of this system call. Also, the operation thread memory region ID indicates the memory region ID of the memory region in which the program containing this system call to be executed exists, while the thread operation rights indicate what kinds of thread operations are allowed, where each of the thread internal status reading right, the thread internal status changing right, and the thread execution stop/start right can be set up independently.

For example, in the exemplary case shown in FIG. 2, for the system call issued by the thread-1 (thread ID=1), the reading and the changing of the internal status of the thread-2 (thread ID=2) are allowed, but the stop/start of the execution of the thread-2 is not allowed. Also, the thread-1 is allowed to carry out the stop/start of the execution of the thread-3 (thread ID=3), but not allowed to make any other thread operations. In addition, this thread operation right table of FIG. 2 implicitly indicates that the thread-1 is not allowed to make any thread operations with respect to the threads other than the thread-2 and the thread-3.

In FIG. 2, a value "all" in the operation thread memory region ID field indicates a case that this system call is valid regardless of which user program it is called from, so that the validity of this system call solely depends on the operation thread ID.

When this operation thread memory region ID field has a value other than "all", the thread operation right fields define the thread operation rights for a case in which this system call is executed from the program existing in the memory region identified by the memory region ID registered in the operation thread memory region ID field. For instance, the thread-3 (thread ID=3) is allowed to make all of the three thread operations with respect to the thread-1 while this thread-3 is executing the program-A (memory region ID=A), but not allowed to make any thread operation otherwise. Consequently, even when the thread-3 tries to execute this system call with respect to the thread-1 while it is executing the program-B (memory region ID=B), this system call will not be carried out. Similarly, when the thread-5 (thread ID=5) tries to execute this system call with respect to the thread-1 while it is executing the program-A, this system call will not be carried out. The thread operations not enlisted in this thread operation right table are not allowed to any thread at all.

Then, the "Thread_Get_Status" execution unit 11 carries out the processing according to the flow chart of FIG. 3 as follows.

First, at the step S1, the operation thread ID of the thread which is executing this system call and the corresponding operation thread memory region ID are obtained from the thread ID register unit 6 and the memory region ID register unit 5, respectively. As described above, the thread ID of the currently executed thread is set by the execution state switching unit 4, while the currently executed memory region ID is set according to the PC value in the processor 2. In addition, the target thread ID is obtained from the first argument of the system call by a target thread ID detection unit 13, while the memory position of the user program for storing the execution result of this system call is detected from the second argument of the system call by a thread data storage position detection unit 14.

Next, at the step S2, the thread operation right table in the thread operation right memory unit 7 is looked up according to the obtained operation thread ID, operation thread memory region ID, and target thread ID, to search out the matching table entry. Here, the search is realized by sequentially making a matching with each table entry starting from the top one, until the matching table entry is found. Here, a value "all" in any field of the table matches with any value. When there is no matching table entry after the matching with the last table entry is made, the search has failed. If the matching table entry is not found, the processing proceeds to the step S8 at which an error code is returned from an error processing unit 15 to a system call finishing unit 17 and the processing ends, whereas when the matching table entry is found, the processing proceeds to the step S3 next.

At the step S3, the value registered for the thread internal status reading right in the thread operation right field of the matching table entry is read out, and whether the thread internal status reading operation is allowed or not is judged by the operation right judgement unit 12. If it is judged that this thread operation is not allowed, the processing proceeds to the step S8 described above, whereas when it is judged that this thread operation is allowed, the processing proceeds to the step S4 next.

At the step S4, the thread status look up operation for reading out the thread internal status of the target thread is executed by looking up the thread management table in the thread management unit 3 from a thread status look up execution unit 16. Then, the data indicating the looked up internal status of the target thread is stored into a memory position specified by the thread data storage position detection unit 14.

Then, at the step S5, whether the result of the execution at the step S4 has been successful or not is judged. In a case it is judged as successful, next at the step S6, a success code is returned to the system call finishing unit 17, whereas otherwise, next at the step S7, a failure code is returned to the system call finishing unit 17.

When this processing at the "Thread_Get_Status" execution unit 11 is finished, the system call finishing unit 17 finishes up the execution of the system call by carrying out a processing for returning the return value of the system call to the user program which executed this system call according to one of the error code, the success code, or the failure code, a processing for restoring a status enabling the execution of the user program which called this system call and has been interrupted, and a processing for setting the execution level of the processor 2 back from the privileged level to the original user level.

In the following, the other system calls for operating the threads will be described.

The "Thread_Set_Status (thread ID, thread status)" system call is an inverse operation to the above described "Thread_Get_Status" system call, by which the thread internal status specified by the second argument is set to the thread specified by the first argument.

In this case, the processing within the OS is shifted from the system call accepting unit 8 to a "Thread_Set_Status" execution unit (not shown) through the system call type judgement unit 10 provided similar to the "Thread_Get_Status" execution unit 11. Here, the "Thread_Set_Status" execution unit has a configuration similar to the "Thread_Get_Status" execution unit 11 described above except that the thread status look up execution unit 16 is replaced by a thread status change execution unit (not shown). Also, in this "Thread_Set_Status" execution unit, the processing is carried out similarly to the case of the "Thread_Get_Status" execution unit 11 except that, at the time of searching the thread operation right table in the thread operation right memory unit 7, the thread internal status changing right is checked and whether the thread internal status changing operation is allowed or not is judged. When this thread internal status changing operation is allowed, it stores the thread data specified by the second argument into the entry in the thread management table in the thread management unit 3 for the thread specified by the first argument.

The "Thread_Suspend (thread ID)" system call is an operation in which the execution of the thread specified by the argument is suspended. This operation is carried out by a "Thread_Suspend" execution unit (not shown) provided similarly as the "Thread_Get_Status" execution unit 11. Here, the "Thread_Suspend" execution unit has a configuration similar to the "Thread_Get_Status" execution unit 11 described above except that the thread status look up execution unit 16 is replaced by a thread suspension operation execution unit (not shown). Also, in this "Thread_Suspend" execution unit, the processing is carried out similarly to the case of the "Thread_Get_Status" execution unit 11 except that, at a time of searching the thread operation right table in the thread operation right memory unit 7, the thread execution stop/start right is checked and whether the thread suspension operation is allowed or not is judged. When this thread suspension operation is allowed, the status of the target thread is obtained from the thread management table in the thread management unit 3 by the thread suspension operation execution unit in the "Thread_Suspend" execution unit. In this case, each entry for each thread in the thread management table has a status data field, and the registered value is either changed from an executable status to a suspended status, or left unchanged from the suspended status. Also, in a case where the target thread is the operation thread itself, after the above described processing for the system call, the control is shifted to the execution state switching unit 4 and the thread to be executed next is determined and activated.

Alternatively, in a case where a plurality of suspended status levels are provided, when the "Thread_Suspend" system call is issued while it is executable, the suspended status level is changed to 0 if it is not already in the suspended status, or the suspended status level is increased by 1 if it is already in the suspended status. This suspended status level is to be larger for a case in which the transition to the execution does not occur for a longer period of time as it is more strongly suspended.

The "Thread_Resume (thread ID)" system call is an operation in which the execution of the thread specified by the argument is resumed. This operation is carried out by a "Thread_Resume" execution unit (not shown) provided similarly as the "Thread_Get_Status" execution unit 11. Here, the "Thread_Resume" execution unit has a configuration similar to the "Thread_Get_Status" execution unit 11 described above except that the thread status look up execution unit 16 is replaced by a thread resume operation execution unit (not shown). Also, in this "Thread_Resume" execution unit, the processing is carried out similarly to the case of the "Thread_Get_Status" execution unit 11 except that, at a time of searching the thread operation right table in the thread operation right memory unit 7, the thread execution stop/start right is checked and whether the thread resume operation is allowed or not is judged. When this thread resume operation is allowed, the status of the target thread is obtained from the thread management table in the thread management unit 3 by the thread resume operation execution unit in the "Thread_Resume" execution unit. In this case, each entry for each thread in the thread management table has a status data field, and the registered value is either changed from a suspended status to an executable status, or left unchanged from the executable status.

Alternatively, in a case where a plurality of suspended status levels are provided, when the "Thread_Resume" system call is issued while it is executable, the suspended status is changed to the executable status if the suspended status level is equal to 0, or the suspended status level is decreased by 1 if the suspended status level is not equal to 0, or else nothing is done if it is already in the executable status.

It is to be noted here that, in this first embodiment, the thread execution stop/start right is provided as a single unified right, but the right to stop the thread execution can be divided into the right for writing out the thread internal status and the right to stop/start the thread execution while the right to start the thread execution can be divided into the right for reading out the thread internal status and the right to stop/start the thread execution, if desired.

It is also to be noted that, in this first embodiment, instead of making the thread internal status reading right, the thread internal status changing right (including the right to delete it), and the thread execution stop/start right to be independently specifiable, but this can be modified by increasing a number of the specifiable rights, i.e., increasing a number of fields for the thread operation rights in the thread operation right memory unit 7, such that the thread execution stop right and the thread execution start right are made to be separately specifiable, or the thread delete right may be provided in addition.

It is further to be noted that, in this first embodiment, it is explained as if the execution unit corresponding to each system call is provided independently from those of the other system calls, but as many of these system call operation execution units as necessary may be provided in parallel, in which case the elements common to all the system call operation execution units may be shared by or identically formed for all the system calls. In correspondence, only those elements similar to the thread status look up execution unit 16 which are executing different system call operations can be provided in parallel, such that the processing can be distributed to the corresponding execution unit either in parallel to or after the operation right judgement.

Next, the second embodiment of a program execution and operation right management system according to the present invention will be described in detail.

In this second embodiment, the thread control item concerning the time limitation is added in the first embodiment described above. This feature is necessary in a case the execution must be finished within the predetermined period of time as in the realtime processing for the plant control for example.

Figure 4A:
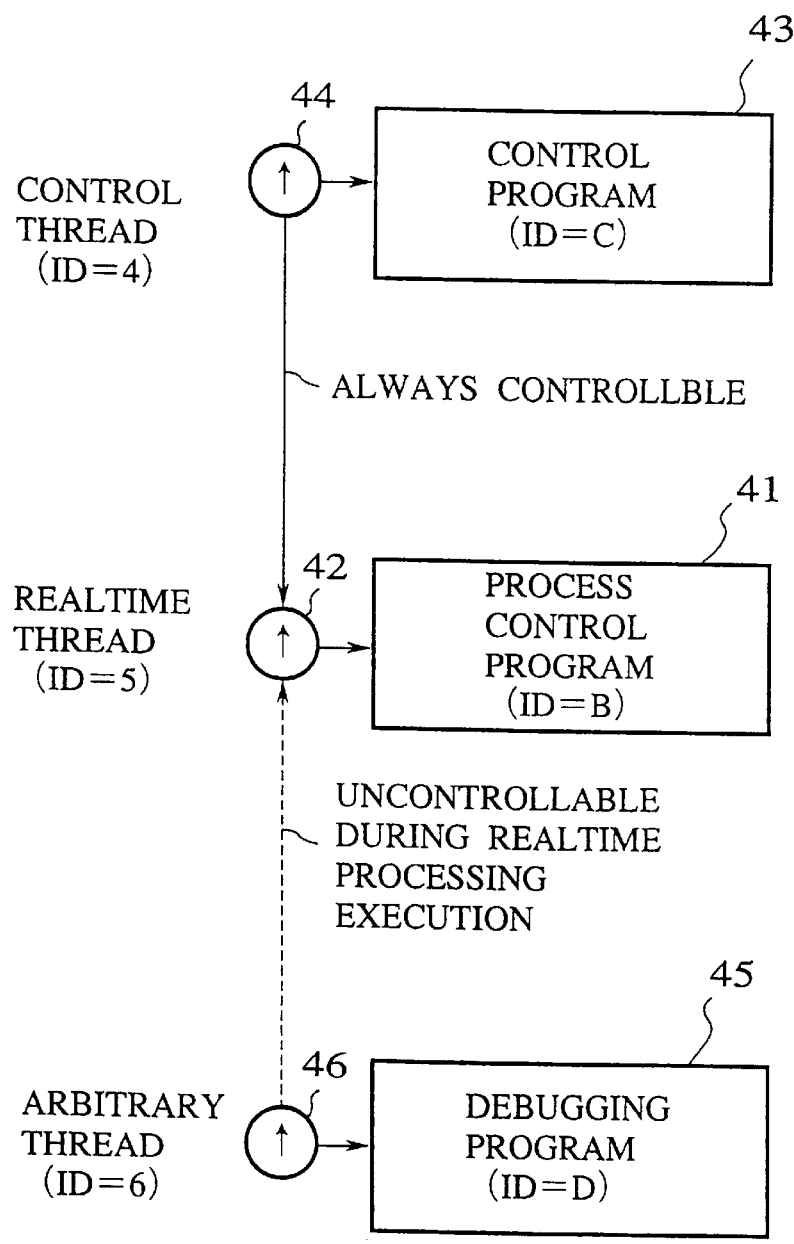
FIG. 4A is a diagram of a program structure in a second embodiment of the program execution and operation right management system according to the present invention.
Figure 4B:
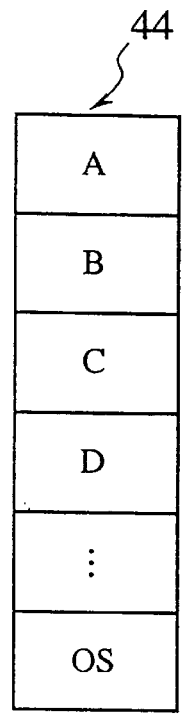
FIG. 4B is a diagram of a single virtual memory space on which the programs in the program structure of FIG. 4A are arranged.

In this second embodiment, the program structure is as shown in FIG. 4A, which includes a process control program (memory region ID=B) 41 for actually carrying out the realtime processing for plant control, a realtime thread (thread ID=5) 42 for executing the realtime processing, and a control program (memory region ID=C) 43 and a control thread (thread ID=4) for controlling the process control program 41 and the realtime thread 42. In addition, a plurality of the other general user programs and threads can be provided on the same system. For example, as shown in FIG. 4A, the debugging program (memory region ID=D) 45 and an arbitrary thread (thread ID=6) 46 for carrying out the debugging processing as the maintenance of the above described programs can be provided. Here, the programs are arranged on a single virtual memory space 47 as shown in FIG. 4B.

As an exemplary case, there is a case in which a period requiring the realtime processing while the plant control is operating is from 9:00 to 17:00. During this period, the realtime thread 42 is going to be concentrated onto the realtime processing, so that it is free from the control from the other threads. The only exception is the control from the control thread 44. In other words, only the control thread 44 for executing the control program such as the processing to stop at a time of the abnormal plant operation is to be allowed.

After 17:00 at which the operation of the plant is over, the realtime processing is unnecessary, so that the above described restriction is removed, and any thread in general can control the realtime thread 42. This is useful as the realtime thread 42 can be made controllable at a time of debugging the process control program 41 by the debugging program 45.

Figure 5:
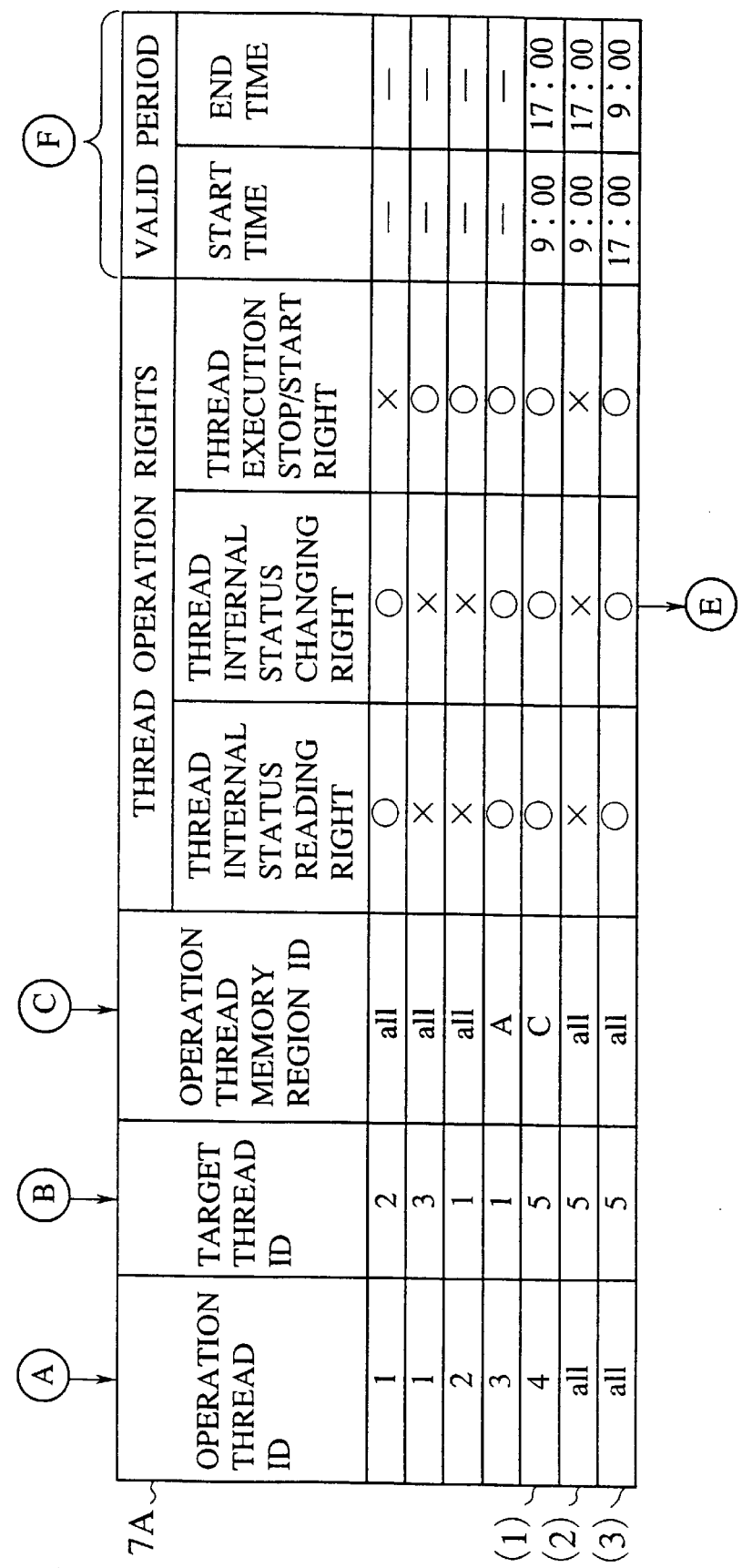
FIG. 5 is an illustration of an exemplary thread operation right table to be used by the second embodiment of the program execution and operation right management system according to the present invention.

The overall system configuration in this second embodiment is similar to that of FIG. 1 for the first embodiment, except that a current time clock unit (not shown) is provided in addition and the thread operation right table in the thread operation right memory unit 7A includes a valid period field in addition to that shown in FIG. 2 for the first embodiment, as shown in FIG. 5. Then, the entries indicating the valid periods are registered in this thread operation right table shown in FIG. 5, which indicate when the set up thread operation right is valid, while the thread operation rights are set up as indicated in FIG. 5. Here, a new set up/delete/change for this thread operation right table can be carried out by the respective specialized system calls from the user program. At a time of such a new set up/delete/change, the consistency with the already set up rights is also carried out such that the settings in the thread operation right table are going to be free of the contradiction.

In FIG. 5, by the setting in the entry (1), during the plant operation period from 9:00 to 17:00, the control thread 44 can carry out all the thread operations with respect to the realtime thread 42 while the control program 43 is executed. Also, by the setting in the entry (3), all the thread operations are also possible even after 17:00.

As for the threads other than the control thread 44, by the setting in the entry (2), none of the thread operations with respect to the realtime thread 42 is allowed between 9:00 and 17:00, but all the thread operations are going to be allowed at a time outside of that time zone by the setting of the entry (3) in which the operation thread field has a value "all".

The current time indicated by the current time clock unit is utilized in the search through the thread operation right table, by making a matching with the valid period registered in the valid period field as well. The rest of the processing in this case is similar to that of the first embodiment described above.

Figure 7:
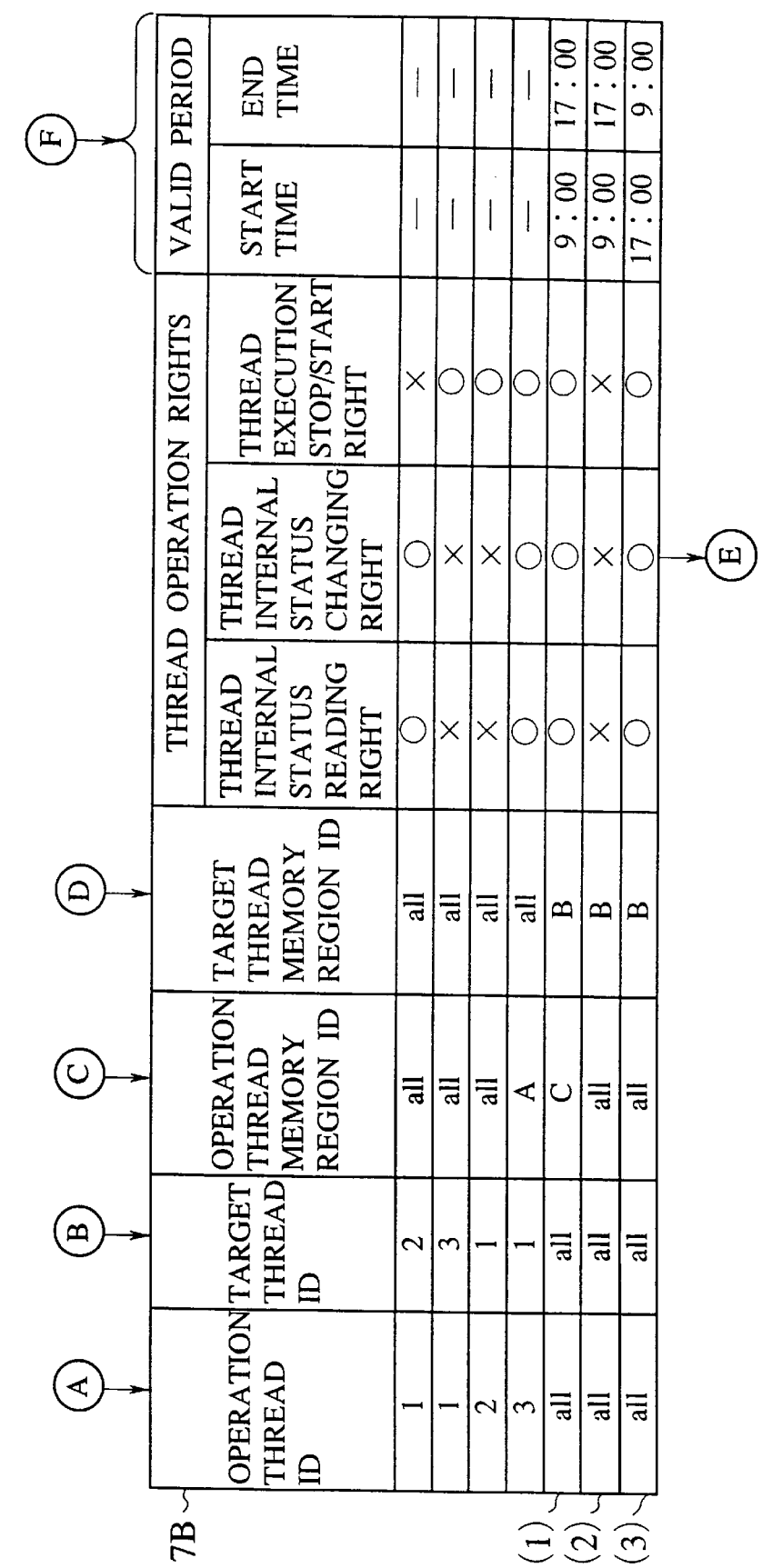
FIG. 7 is an illustration of an exemplary thread operation right table to be used by one modification of the second embodiment of the program execution and operation right management system according to the present invention.

Now, a case of modifying the thread operation right table in the thread operation right memory unit 7B as shown in FIG. 7 will be described. This is a case in which an additional field for a target thread memory region ID indicating the memory region at which the target thread exists is added to the thread operation right table of FIG. 5. In this case, the thread operation rights for the specified operation thread executing the program of the specified operation thread memory region with respect to the specified target thread located at the specified target thread memory region are going to be defined.

Figure 6:
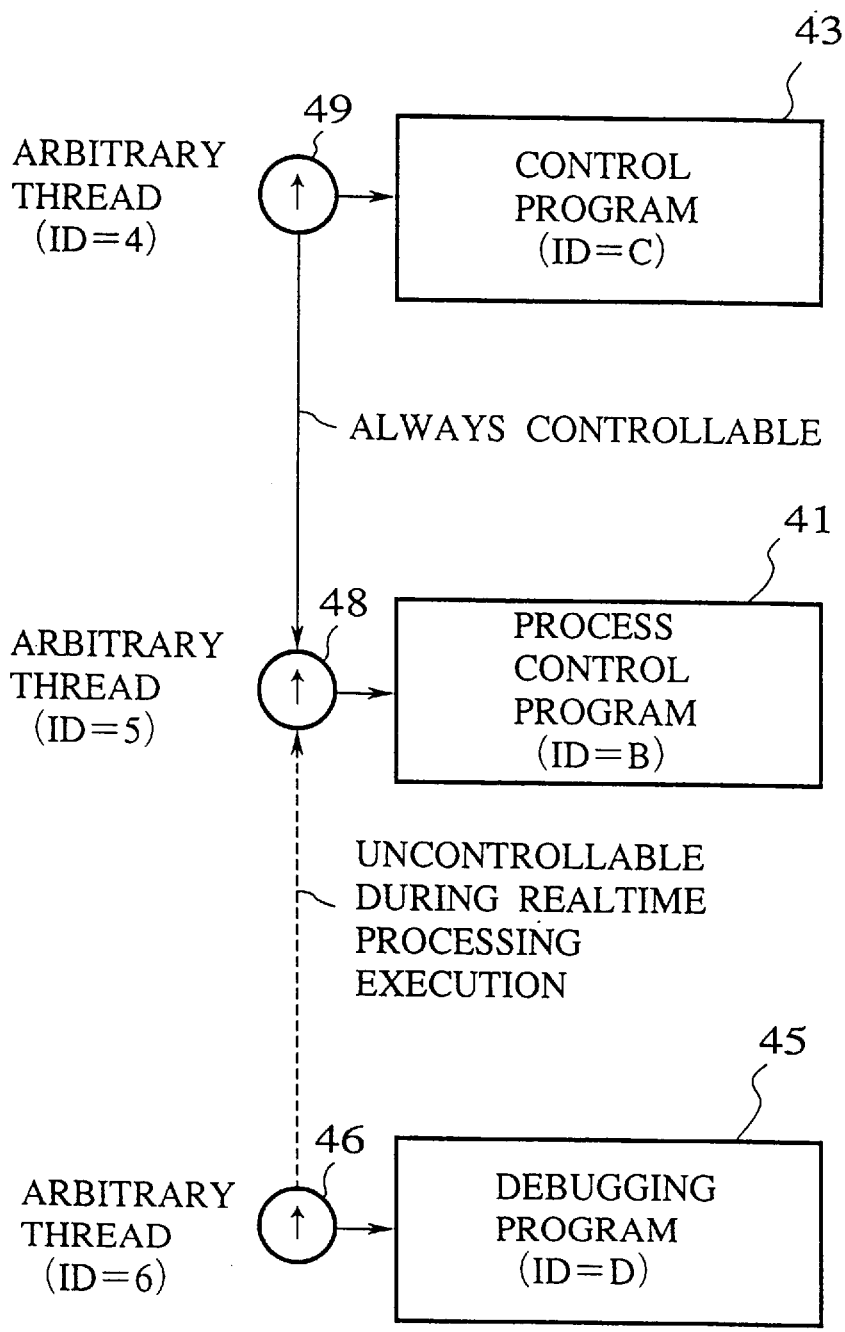
FIG. 6 is a diagram of a program structure in one modification of the second embodiment of the program execution and operation right management system according to the present invention.

In this case, when the process control realtime processing is to be realized as before, the programs and the threads are arranged as shown in FIG. 6, in which arbitrary threads 48 and 49 replace the dedicated realtime thread 42 and control thread 44 used in FIG. 4A, respectively. In other words, it can be realized by the thread structure in which a series of processings are carried out while shifting the control among a plurality of programs.

Here, the settings in the thread operation right table are as indicated in FIG. 7. Namely, by the setting in the entry (1), during the plant operation period from 9:00 to 17:00, the arbitrary thread 49 executing the control program 43 in the memory region C can carry out all the thread operations with respect to the arbitrary thread 48 executing the process control program 41 in the memory region B. Also, by the setting in the entry (3), all the thread operations are also possible even after 17:00.

On the other hand, by the setting in the entry (2), none of the thread operations from the arbitrary thread executing the program in the memory region other than the memory region C with respect to any of the thread located in the memory region B is allowed between 9:00 and 17:00, but all the thread operations are going to be allowed at a time outside of that time zone by the setting of the entry (3) in which the operation thread field has a value "all".

Figure 8:
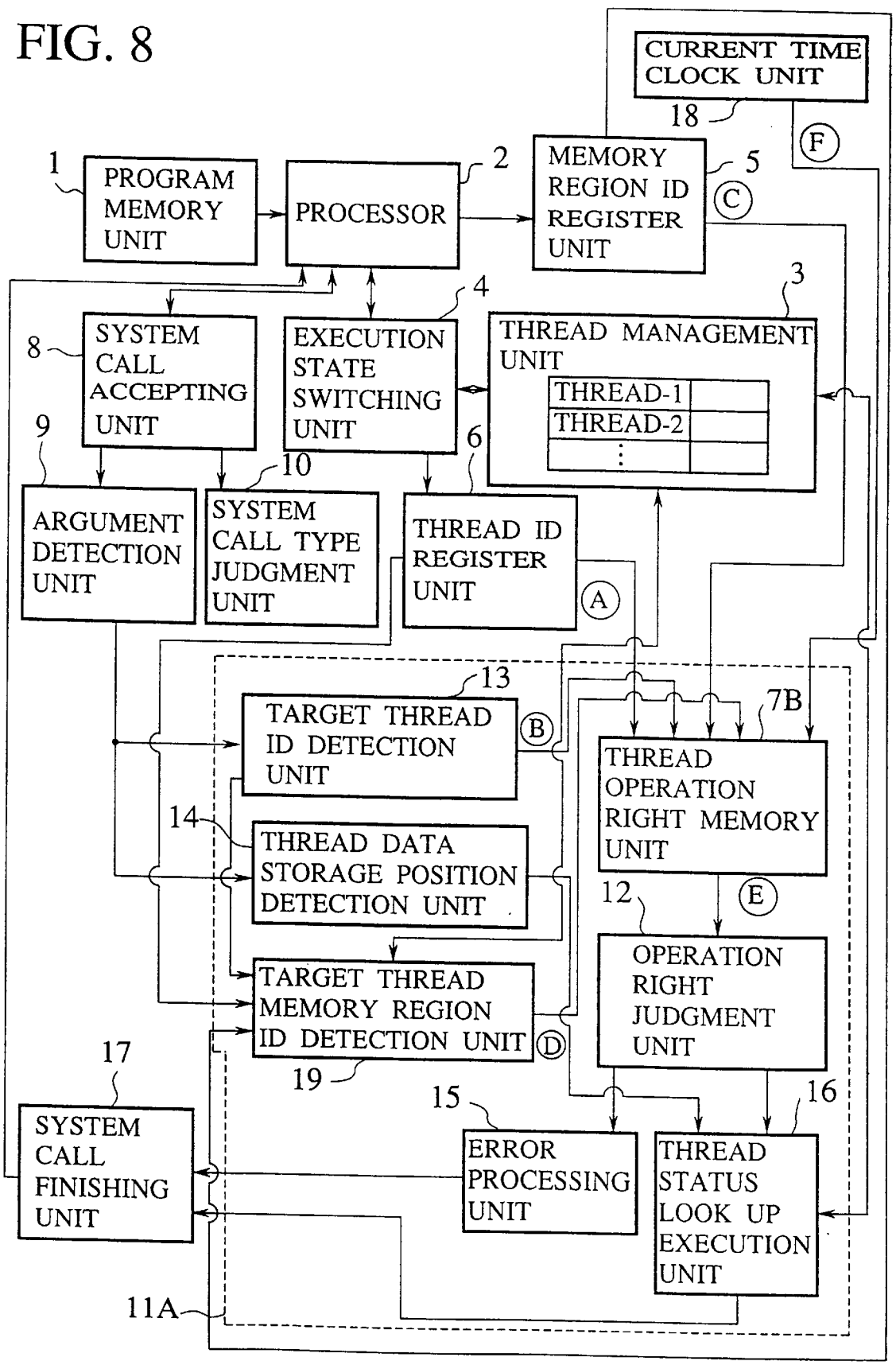
FIG. 8 is a block diagram of one modification of the second embodiment of the program execution and operation right management system according to the present invention.

For this case, the system configuration is modified as shown in FIG. 8, in which the current time clock unit 18 is provided to be connected with the thread operation right memory unit 7B, and a target thread memory region ID detection unit 19 is added between the thread operation right memory unit 7B and the memory region ID register unit 5, the thread ID register unit 6, and the target thread ID detection unit 13, in order to detect the memory region ID of the memory region in which the thread with the target thread ID specified by the system call currently exists. The rest of the configuration of FIG. 8 is similar to that of FIG. 1 for the first embodiment.

Figure 9:
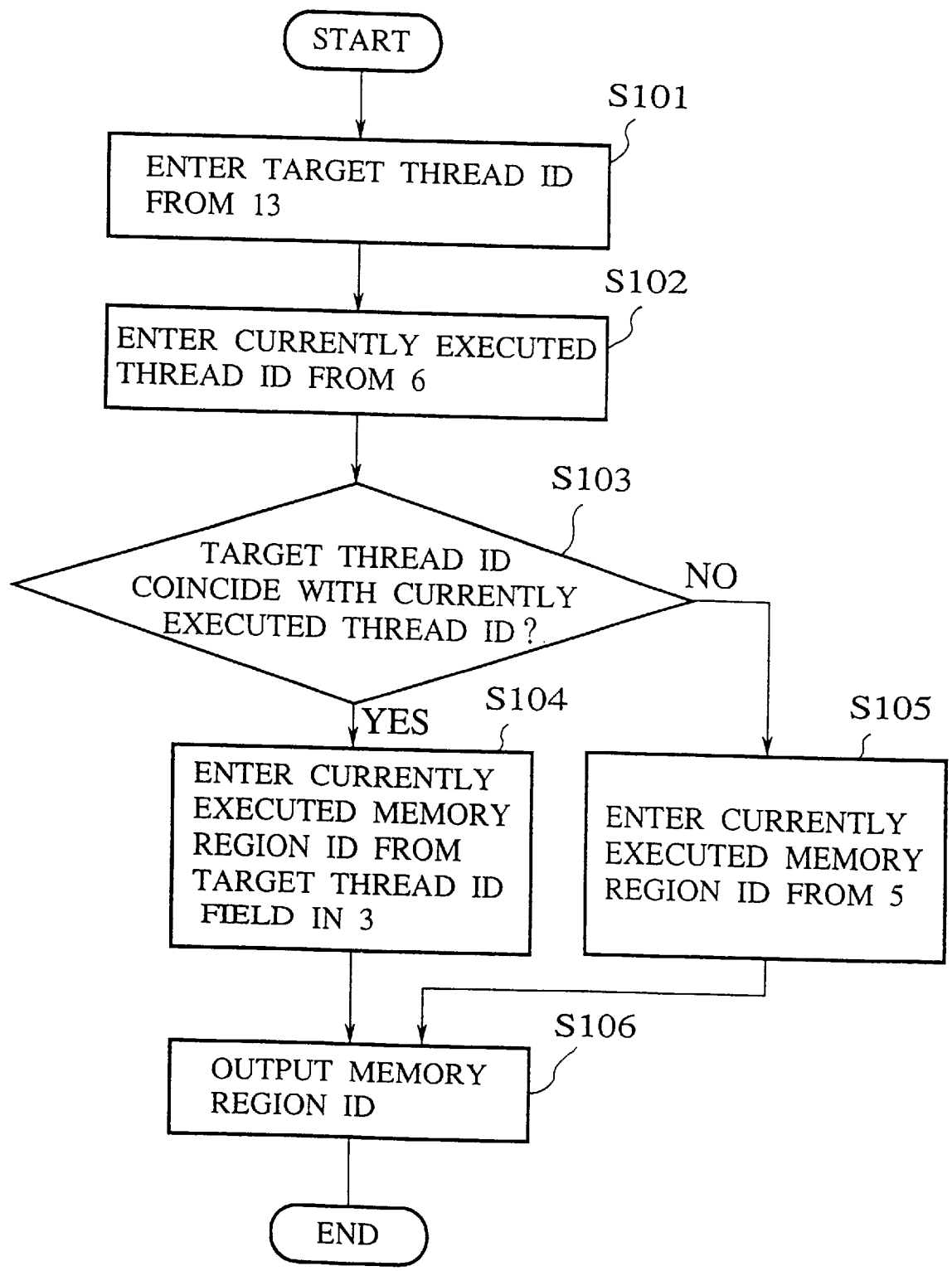
FIG. 9 is a flow chart for the operation of a target memory region ID detection unit in the system of FIG. 8.

Here, the target memory region ID detection unit 19 operates according to the flow chart of FIG. 9 as follows. Namely, the target thread ID is entered from the target thread ID detection unit 13 at the step S101, and the currently executed thread ID is entered from the thread ID register unit 6 at the step S102. Then, whether the target thread ID coincides with the currently executed thread ID or not is judged at the step S103. If they coincide, the currently executed memory region ID is entered from the thread data in the thread management table of the thread management unit 3 for the target thread specified by the target thread ID field at the step S104, whereas otherwise the currently executing memory region ID is entered from the memory region ID register unit 5 at the step S105. Then, in either case, the entered memory region ID is outputted at the step S106.

Figure 3:
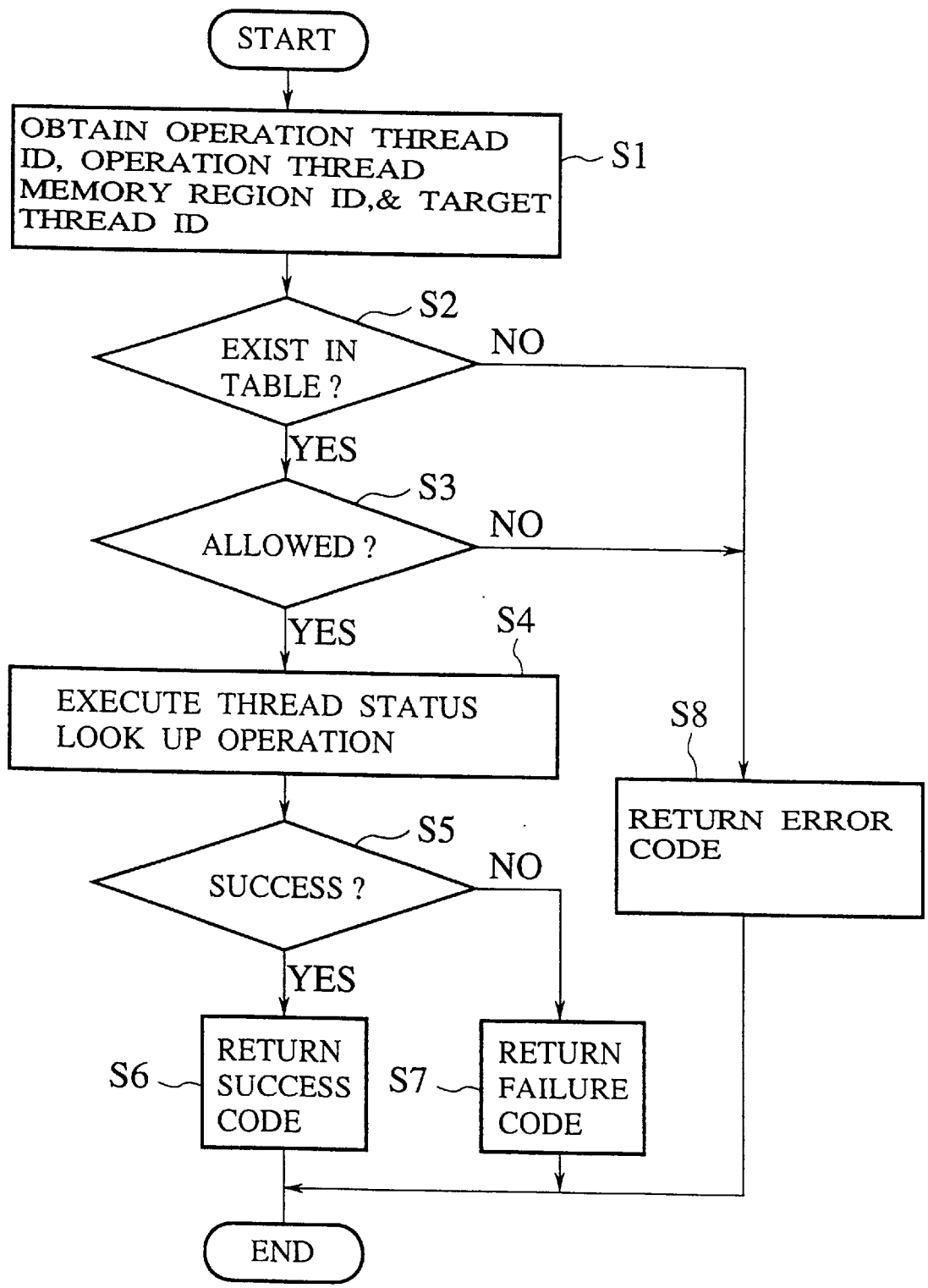
FIG. 3 is a flow chart for the processing to be carried out by a Thread_Get_Status execution unit in the system of FIG. 1.

As for the processing in this system, it is similar to that of the first embodiment except that the current time data and the target thread memory region ID data are also utilized in the search at the step S2 in FIG. 3.

Next, the third embodiment of a program execution and operation right management system according to the present invention will be described in detail.

Figure 10:
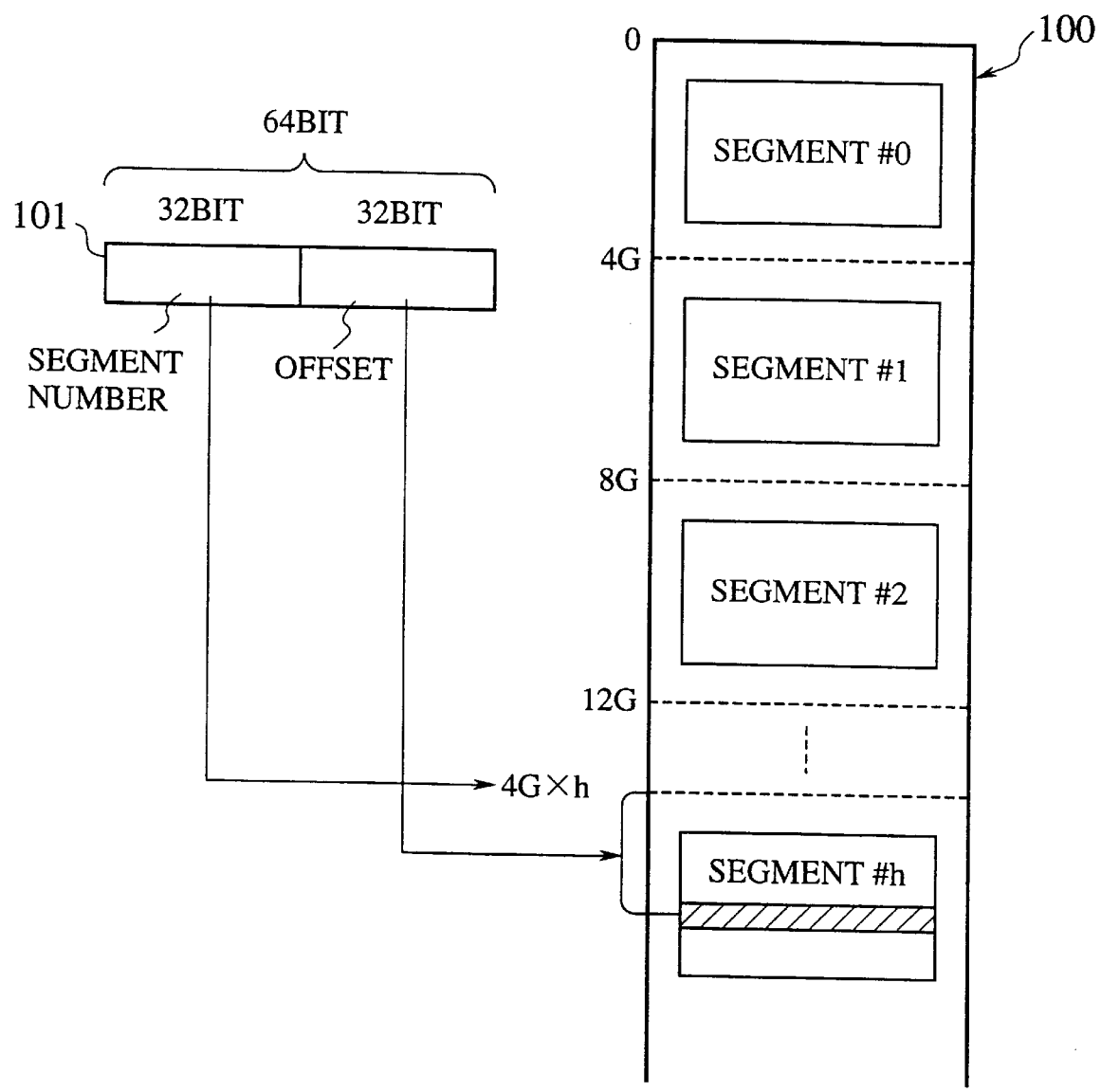
FIG. 10 is a diagram of a basic memory management mechanism utilized in a third embodiment of the program execution and operation right management system according to the present invention.

In this third embodiment, the control of the thread operations is carried out in conjunction with the memory management. Here, the basic mechanism for the memory management is shown in FIG. 10, where the logical address space 100 is divided into a number of segments, and the address in this logical address space is specified by a 64 bit address 101 comprising an upper 32 bit field indicating a segment number and a lower 32 bit field indicating an offset from a top address within the segment. The size of one segment is variable in this case.

These segments are protected from the improper access among them by a memory protection function in the memory management mechanism. This memory protection function checks whether a memory access made from a processor is a proper one or not at high speed, and managed by the OS.

Figure 11:
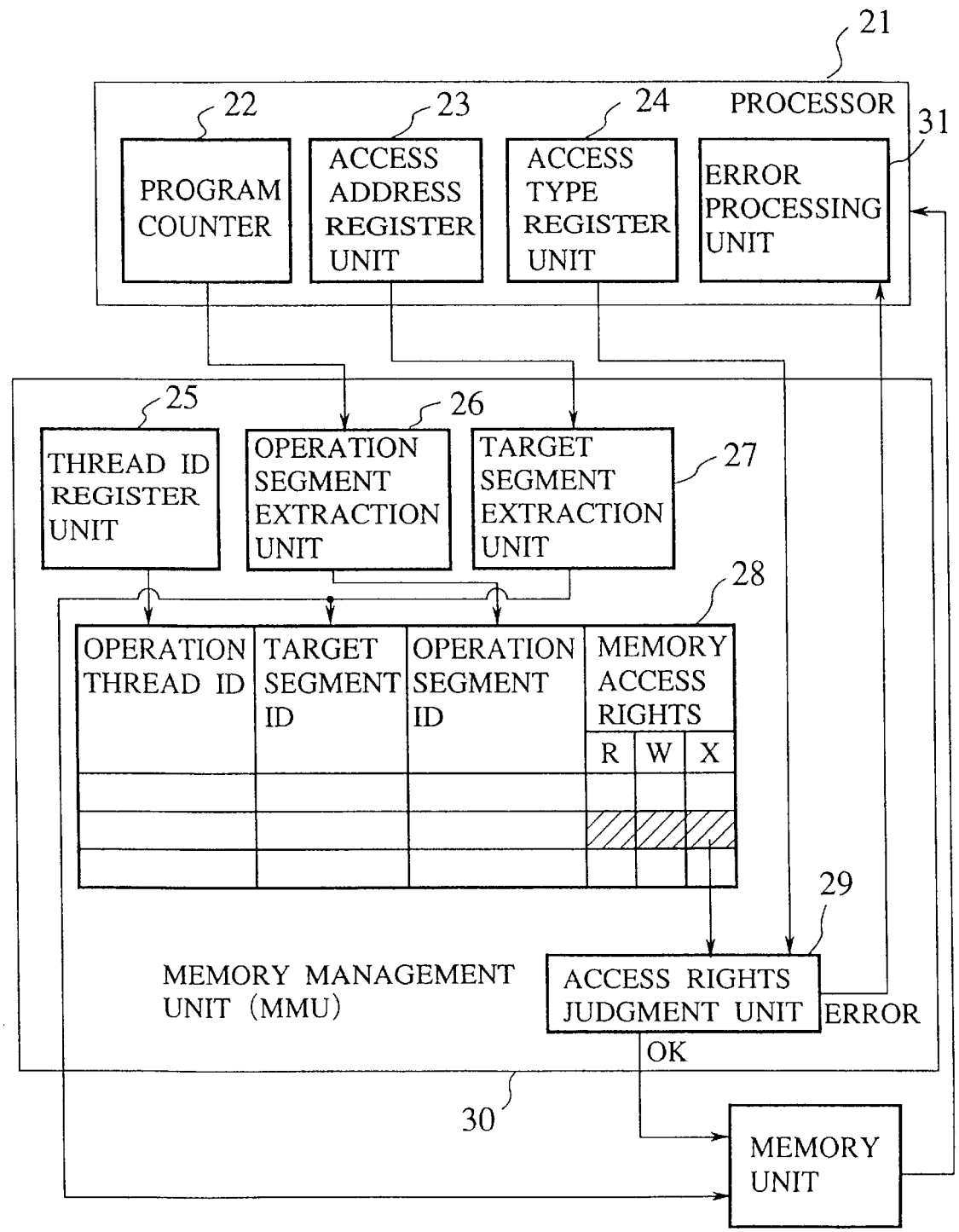
FIG. 11 is a schematic block diagram of the third embodiment of the program execution and operation right management system according to the present invention.

In this case, the memory protection function is realized by a memory management unit (MMU) 30 shown in FIG. 11. This MMU 30 comprises: a thread ID register unit 25 which is a register holding the currently executed thread ID CURTH; an operation segment extraction unit 26 for extracting a segment number of a segment in which the currently executed program exists from a value of the program counter (PC) 22 in a processor 21; a target segment extraction unit 27 for extracting a segment number of an address to be accessed stored in an access address register unit 23 in the processor 21; a table look-up buffer (TLB) 28 formed by an associative memory which is a cache for retrieving the memory protection data at high speed; and an access right judgement unit 29 for judging state of an access right for a requested access in a requested access type stores in an access type register unit 24 in the processor 21 according to the TLB 28. Here, each entry in the TLB 28 includes fields for the operation thread ID, the target segment number, and the operation segment number, which are collectively referred as a tag, as well as fields for various memory access rights (such as reading right R, writing right W, and execution right X). The target segment number extracted by the target segment extraction unit 27 is stored in an external memory 32 when the judgement result obtained by the access right judgement unit 29 is "OK" indicating that the requested access is permitted, whereas when the judgement result obtained by the access right judgement unit 29 is "Error" indicating that the requested access is not permitted, an error processing unit 31 in the processor 21 is activated.

Now, the operation of this memory protection function will be described by using the 64 bit logical address ADDR having the upper 32 bit field indicating the segment number MSID and the lower 32 bit field indicating the offset OFS within the segment.

When the processor 21 tries to make an access to the memory at the logical address ADDR, the operation segment extraction unit 26 and the target segment extraction unit 27 of the MMU 30 separate the logical address ADDR into the segment number MSID and the offset OFS. Also, from the value of the program counter PC indicating the currently executed program, the segment number PCMSID of a segment in which the currently executed program exists is extracted. Then, these MSID and PCMSID as well as the CURTH indicating the current thread ID are transferred to the TLB 28. In response, the TLB 28 searches for an entry having a tag matching with these input values. Here, in a case where there is a tag with a field in which all the bits have a value "1", this entry is regarded as a wild card which matches with any input value for that field. For example, when the operation segment ID field in a certain tag has all the bits with the value "1", this tag is regarded as matching with the current status regardless of the segment in which the operation thread exists, and the entry having this tag is taken as a matching entry.

Then, when there is a matching entry, the TLB 28 outputs the memory access right field content PERM of this matching entry. The access right judgment unit 29 then compares the values of PERM with an ACCESS signal representing the content of the access type register unit 24 which indicates the type of the access to be made, and judges whether this requested memory access is permitted or not. In a case when it is not permitted, the access right judgement unit 29 returns a FAULT signal to the error processing unit 31 of the processor 21. Also, when there is no matching entry found in the TLB 28, the access right judgement unit 29 also returns the FAULT signal to the processor 21. On the other hand, in a case when it is permitted, the MMU 30 converts the logical address outputted from the processor 21 into the physical address by using the address conversion mechanism (not shown), and outputs the obtained physical address to the system address bus (not shown). Here, the OS realizes the memory access protection requested by the user and the OS by appropriately updating the contents of the TLB 28.

Now, in a system equipped with such a memory management mechanism, by allocating each segment uniquely to each thread as indicated in FIG. 12A, and placing the user rewritable portion of the thread data within the allocated segment, the protection of the thread operation can be reduced to the protection of the memory operation, such that the management of the thread operations can be realized by utilizing the hardware for the memory protection without requiring an addition of new hardware.

In an exemplary case of making an access to the thread data of the thread-2 from the thread-1 executing the program on the segment-A, because the system is equipped with the above described memory management mechanism, the different program protection conditions can be set up for the programs on the different memory segments even within the same logical address space. Therefore, by placing the program constituting the OS at a certain segment, and setting up such memory protection conditions that an access to any memory from the program in that certain segment is permitted, the equivalent effect as the transition to the privileged level in the first embodiment described above can be achieved as far as the memory access is concerned. In this case, the system call with respect to the OS is not necessarily a special instruction, and an ordinary subroutine call up instruction used among the segments can be used for this purpose.

Figure 13:
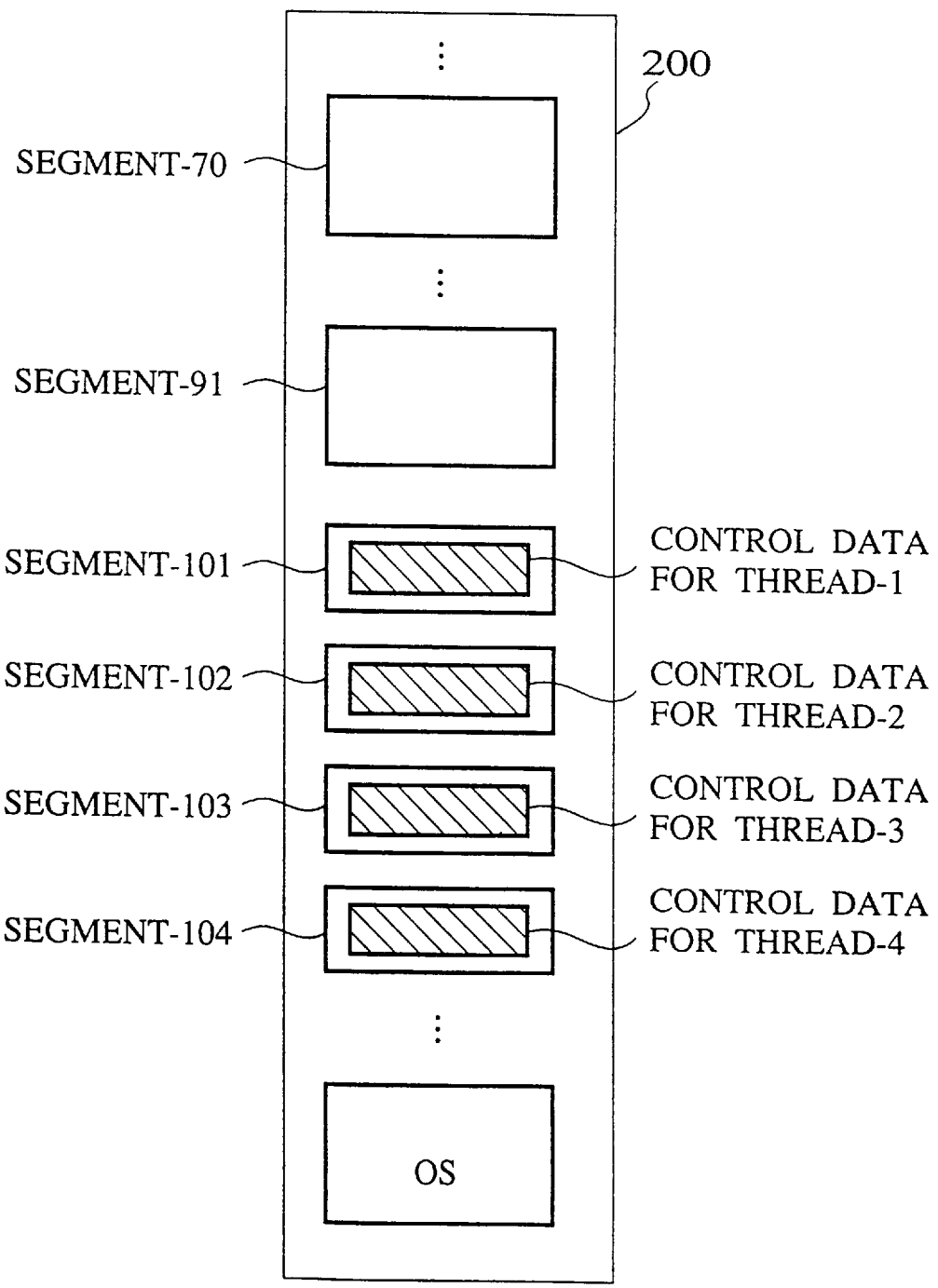
FIG. 13 is a diagram indicating exemplary correspondences between the thread data and the segment number in the system of FIG. 11.

Here, suppose that the thread data is in one-to-one correspondence with the segment number in the logical address space 200 as shown in FIG. 13, so that the control data for the thread-1 corresponds to the segment number 101, the control data for the thread-2 corresponds to the segment number 102, etc. Then, such a correspondence relationship between the thread data and the segments can be registered in the thread management table as indicated in FIG. 12B.

This FIG. 12B shows an exemplary setting for the TLB 28 such that the same management results as in the exemplary case for the first embodiment described above can be realized. For example, when the thread-1 tries to read out the memory content in the segment-102 in order to check the internal data of the thread-2 while the thread-1 is executing the program in the segment-91, the MMU 30 extracts the segment number 102 from the logical address to be accessed by the processor 21, and looks up the TLB 28 by using this segment number 102, the thread ID 1 of the thread-1, and the segment number 91 of the currently executed segment as the searching key. In this case, there is a matching entry in the TLB 28 (first entry in FIG. 12B), so that the memory access right data of the matching entry is outputted to the access right judgement unit 29. In this case, the reading right (R) is assigned for the requested memory access, so that the access is permitted.

As another example, in a case where the thread-1 tries to make an access to the data of the thread-4 under the same situation of FIG. 12B, the access to the memory in the segment 104 is attempted, and the TLB 28 is looked up by using this segment number 104 and the thread ID 1 of the thread-1 as the searching key. In this case, there is no matching entry in the TLB 28 shown in FIG. 12B, so that the TLB outputs the non-coincidence signal and in response the MMU 30 returns the FAULT signal to the processor 21, so as to indicate that the requested access is not permitted.

Thus, in this third embodiment, the contents of the thread management table used in the first embodiment are placed at a prescribed position in the logical address space, and the TLB is utilized as the thread operation right memory unit of the first embodiment, so as to realize the similar thread operation management as in the first embodiment described above.

As described, according to the first to third embodiments described so far, it is possible to realize the effective protection of the thread from the improper thread operation instructions or the erroneous thread operation instructions, and as a consequence, the debugging of the programs can be made easier.

Moreover, according to the third embodiment described above, the high speed thread access right management can be realized without requiring an addition of any new instruction for the thread operation right judgement purpose to the instruction sets of the processor.

Next, the fourth embodiment of a program execution and operation right management system according to the present invention will be described in detail.

In this fourth embodiment, the first embodiment is modified such that the right to change the thread operation right setting is also managed.

In general, the operation rights include those for the management of the threads and those for the management of the memory regions, but the management of the threads has many features common to the management of the memory regions. Consequently, in the following, the case of the thread operation right management will be mainly described and the overlapping features of the memory region operation right management will be omitted. Note that the memory operation here indicates the access for reading, writing, and executing.

Before the description of the detailed embodiment, the main features of this fourth embodiment will now be summarized briefly. In this fourth embodiment, there is provided a list for registering data concerning under what conditions the operation with respect to the individual memory region or thread is to be allowed such that the operation with respect to the memory region or thread is allowed only when the allowance is given by this list. In addition, the rights for changing these data for managing the memory region or thread operations are also managed in the format identical, similar, or common to this list. Moreover, the mechanism for allowing the changes of these data only under the specific conditions is also provided. Furthermore, the rights for changing the memory region or thread operation changing rights are also managed in the format identical, similar, or common to this list.

As a result, in this fourth embodiment, the memory region or thread has the right for changing the data indicating the allowance of the memory region or thread operation as well, so that not just the management of the operation rights but also the rights for managing the operations rights can be flexibly managed, deleted, added, or changed in the identical, similar, or common format, and therefore it becomes easier to protect the memory region or thread from the improper operation instructions or the program errors and to detect the program error by detecting such erroneous operation instructions.

As for the rights for managing these operation rights, they are given in the similar format as the ordinary access control list by the mechanism which is totally independent from the owners of the memory regions or threads, so that it becomes possible to realize the flexible operation right management in which the right for managing the operation right can be shared by a plurality of threads, or the memory region or thread management right created by one thread can be handed over to the other thread.

Figure 14:
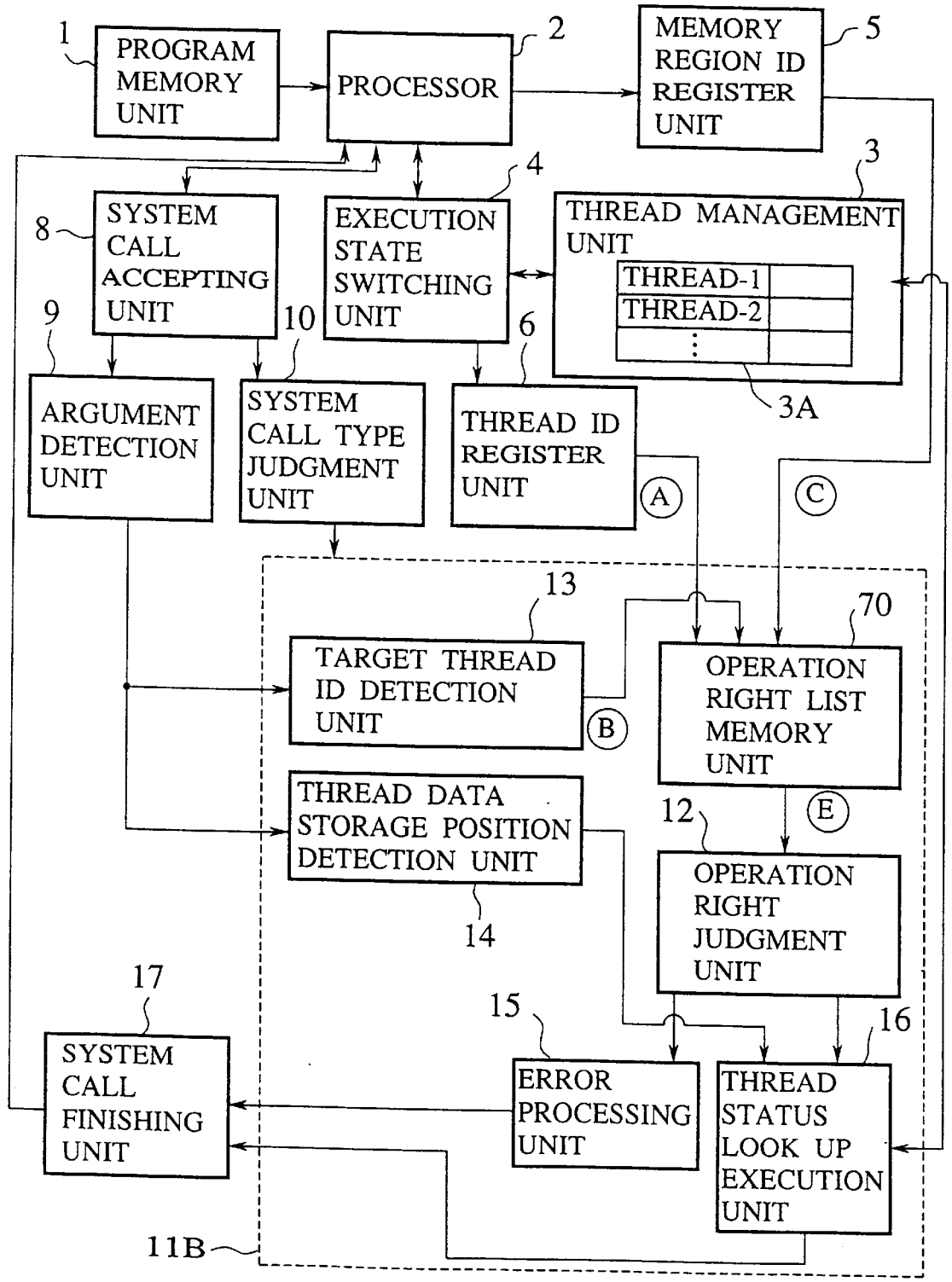
FIG. 14 is a block diagram of one part of a fourth embodiment of the program execution and operation right management system according to the present invention.

In this fourth embodiment, the program execution and operation right management system has an overall configuration shown in FIG. 14, which differs from that of the first embodiment shown in FIG. 1 in that the thread operation right memory unit 7 in FIG. 1 is replaced by an operation right list memory unit 70 in the "Thread_Get_Status" execution unit 11B of this FIG. 14.

Figure 15:
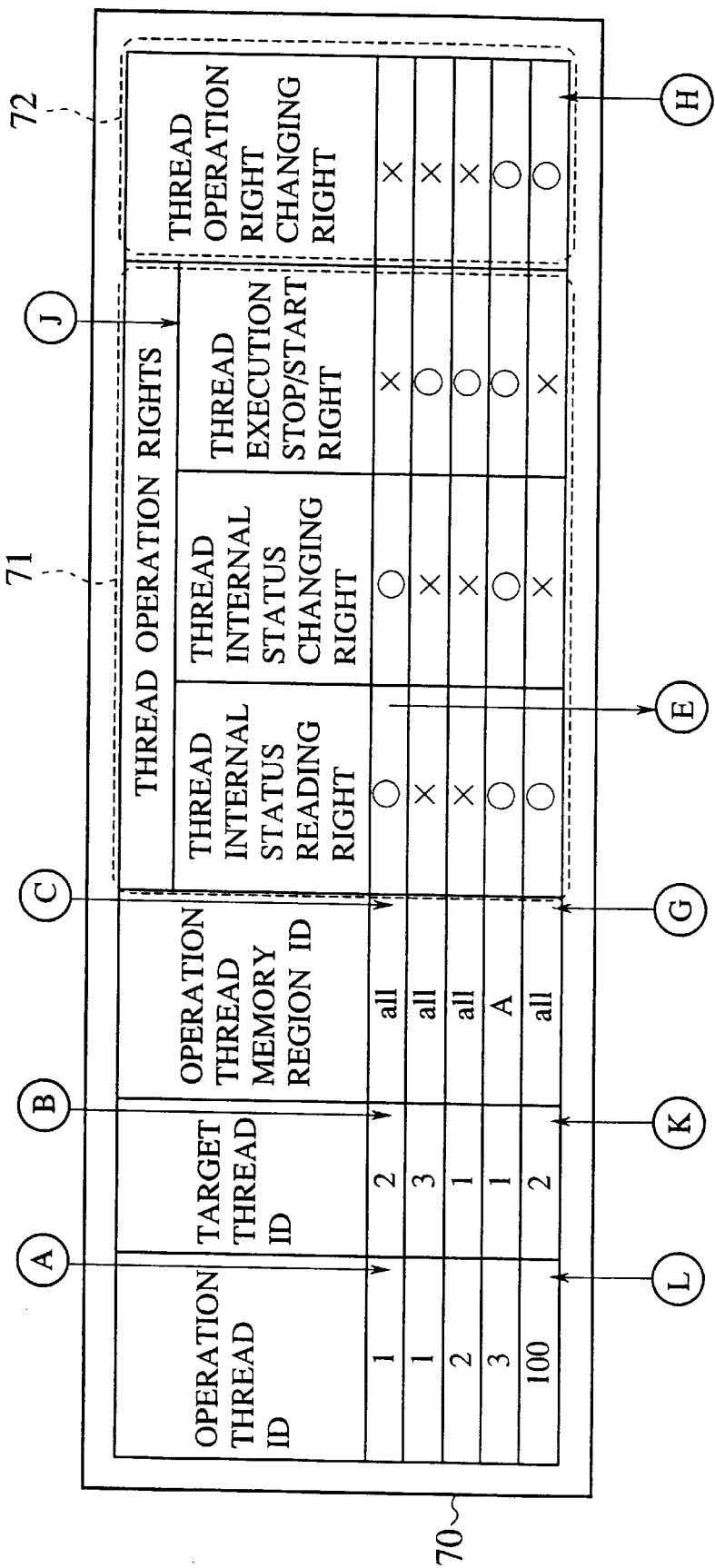
FIG. 15 is an illustration of an exemplary operation right list to be used by an operation right list memory unit in the system of FIG. 14.

Here, the operation right list memory unit 70 has a table concerning thread protection in a form of an operation right list as shown in FIG. 15, which differs from the thread operation right table of the first embodiment shown in FIG. 2 in that a thread operation right changing right field 72 is provided next to the thread operation right field 71. This operation right list of FIG. 15 is for an exemplary case of the thread operation right management to be described below, but in a case of the memory region operation right management, the similar operation right list concerning the memory region protection will be provided to store the data indicating the rights to execute the operations with respect to the memory regions for each thread. Also, the operation right list of FIG. 15 may be further modified to include a target thread memory region ID field in addition, if desired.

In this fourth embodiment, the thread operation right changing right represents the right for changing the data in the thread operation right field. The entry having this thread operation right changing right can change any one of the data registered in the thread operation right field of this entry for the target thread ID of this entry, as well as the data registered in the thread operation right changing right of this entry. Thus, in FIG. 15, the thread-1 (thread ID=1) is allowed to read and change the internal status of the thread-2 (thread ID=2) but not allowed to stop/start the execution of the thread-2 or to change these operation rights set for the thread-2. On the other hand, the thread-100 (thread ID=100) is allowed to read the internal status of the thread-2 as well as to change the operation right.

It is also possible to modify this operation right list of FIG. 15 such that the thread operation right changing right can be specified for each thread operation right separately. Also, the thread operation right for the thread operations other than those three enlisted in the operation right list of FIG. 15 may also be included. For example, the start time and the end time of the valid period for providing a time limitation to the validity of the user ID or the data in the thread operation right field can be provided in a manner of the second embodiment described above. Moreover, the right to change such other thread operation right may also be provided in addition.

It is also possible to divide this operation right list of FIG. 15 into separate tables for the thread operation right section and the thread operation right changing right section, such that the operation thread ID, the target thread ID, and the operation thread memory region ID can be specified for the thread operation right section and the thread operation right changing right section separately.

In this fourth embodiment, the processing in the case of the "Thread_Get_Status" system call is similar to that according to the flow chart of FIG. 3 described above for the first embodiment.

Next, a case of the system call for changing the thread operation rights in the thread operation right field 71 will be described.

Namely, there is provided a system call "Thread_Add_ Acl (specified operation thread ID, specified target thread ID, specified operation thread memory region ID, specified operation right to be added)" which newly adds the new thread operation right to the operation right list.

Suppose the thread-100 tries to assign the right to stop/ start the execution of the thread-2 to the thread-1 in the situation shown in FIG. 15. In the case, in the program-C written in the C language, this will be described as follows:

err=Thread_Add_Acl (1, 2, all, Thread_Suspend)

where the function "Thread_Add_Acl" represents the system call for adding a new operation right with respect to the thread, in which the first argument "1" indicates the specified operation thread ID of the thread-1 to which the new operation right is to be assigned, the second argument "2" indicates the specified target thread ID of the thread-2 which is a target of the thread operation managed by the new operation right, the third argument "all" indicates that the specified operation thread memory region ID is going to be arbitrary, and the fourth argument "Thread_Suspend" indicates the specified operation right to be added for the combination of the specified operation thread ID, specified target thread ID, and specified operation thread memory region ID which are specified by the first, second, and third arguments, respectively.

In this example, the fourth argument "Thread_Suspend" indicates that the right to stop/start the execution of the thread is to be added. Here, it is also possible to specify more than one types of the operation rights in the fourth argument simultaneously.

When this function is executed by the thread 100 of the program-C, the thread-100 makes the transition in the execution level of the processor 2 from the user level to the privileged level by this system call, and calls up the OS.

In the OS so called up, the processing is shifted to the system call accepting unit 8, which carries out the interruption processing for the user program which called this system call, receives the type of the system call requested and the arguments specified, and transmits the received arguments and system call type to the argument detection unit 9 and the system call type judgement unit 10, respectively.

Figure 16:
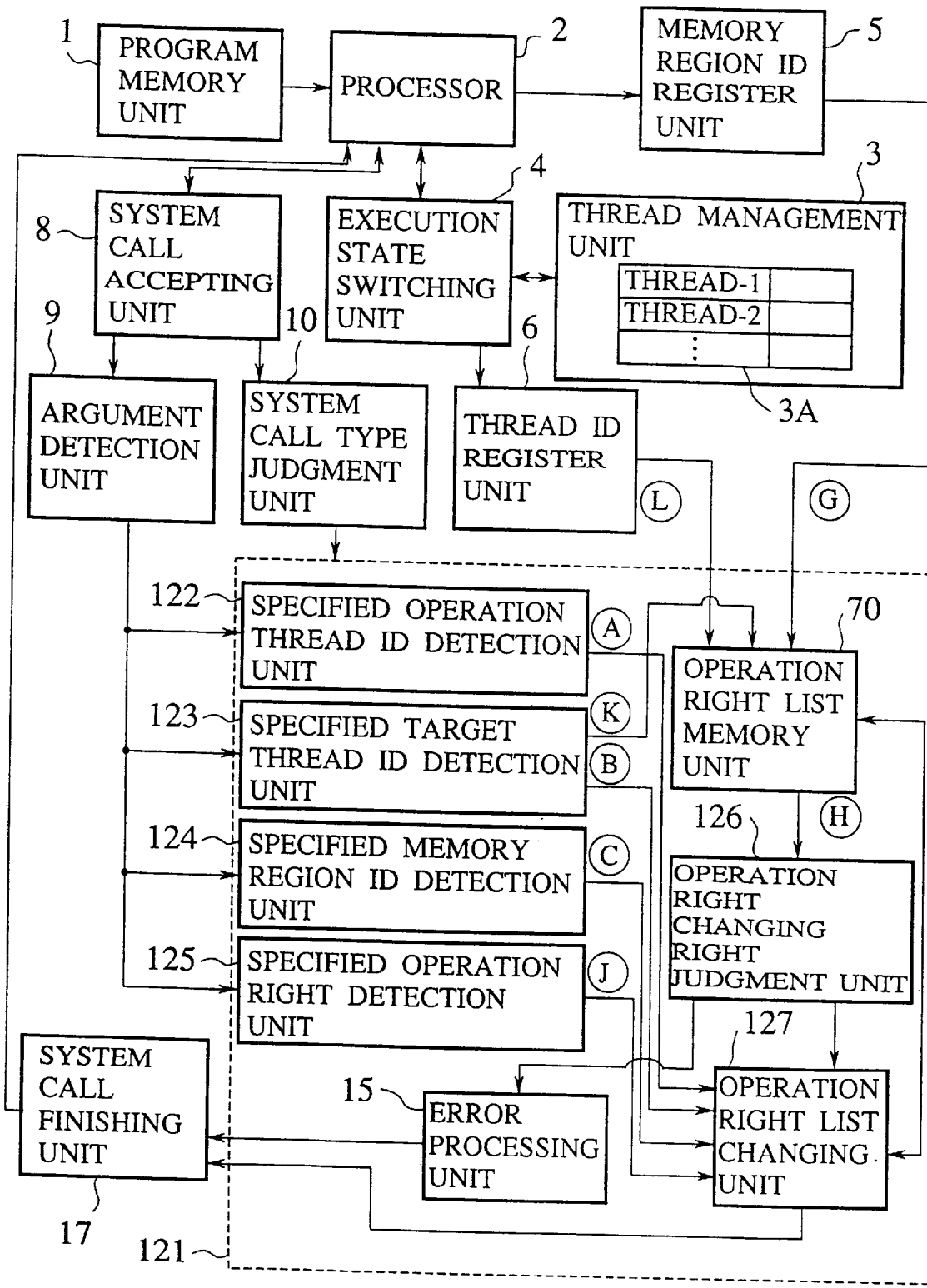
FIG. 16 is a block diagram of another part of a fourth embodiment of the program execution and operation right management system according to the present invention.

In this exemplary case, the requested system call is the "Thread_Add_Acl", so that the system call type judgement unit 10 calls up a "Thread_Add_Acl" execution unit 121 shown in FIG. 16. It is to be noted that this "Thread_Add_Acl" execution unit 121 is shown in FIG. 16 as if it is replacing the "Thread_Get_Status" execution unit 11B shown in FIG. 14, although these "Thread_Add_Acl" execution unit 121 and the "Thread_Get_Status" execution unit 11B are actually provided together in the same system, in parallel with respect to the other elements of the system commonly shown in both FIG. 14 and FIG. 16, and they are separately shown in FIGS. 14 and 16 only for the sake of simplifying the drawings in order to assist the easy comprehension of each feature.

This "Thread_Add_Acl" execution unit 121 carries out the processing according to the operation right list as shown in FIG. 15 which is provided in the operation right list memory unit 70 as already described above.

Figure 17:
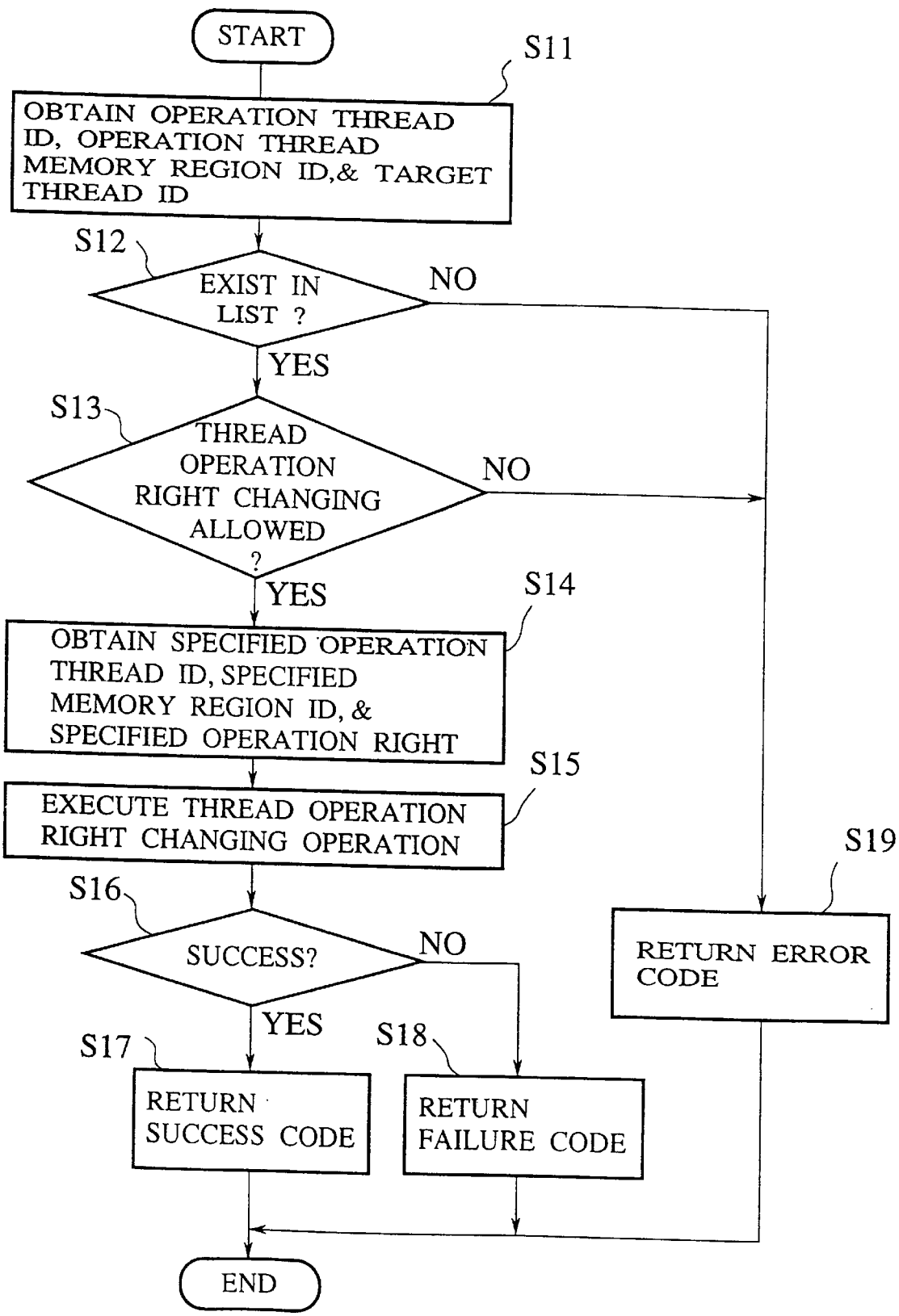
FIG. 17 is a flow chart for the processing to be carried out by a Thread_Add_Acl execution unit in the system of FIG. 16.

Then, the "Thread_Add_Acl" execution unit 121 carries out the processing according to the flow chart of FIG. 17 as follows.

First, at the step S11, the specified operation thread ID of the thread which is executing this system call and the corresponding specified operation thread memory region ID are obtained from the thread ID register unit 6 and the memory region ID register unit 5, respectively. In addition, the specified target thread ID is obtained from the second argument of the system call by a specified target thread ID detection unit 23.

Next, at the step S12, the operation right list in the operation right list memory unit 70 is looked up according to the obtained operation thread ID, operation thread memory region ID, and specified target thread ID, to search out the matching entry. Here, the search is realized by sequentially making a matching with each entry starting from the top one, until the matching entry is found. Here, a value "all" in any field of the table matches with any value. When there is no matching entry after the matching with the last entry is made, the search has failed. If the matching entry is not found, the processing proceeds to the step S19 at which an error code is returned from the error processing unit 15 to the system call finishing unit 17 and the processing ends, whereas when the matching entry is found, the processing proceeds to the step S13 next.

At the step S13, the value registered for the thread operation right changing right field of the matching entry is read out, and whether the thread operation right changing operation is allowed or not is judged by an operation right changing right judgment unit 26. If it is judged that this thread operation is not allowed, the processing proceeds to the step S19 described above, whereas when it is judged that this thread operation is allowed, the processing proceeds to the step S14 next.

At the step S14, the specified operation thread ID is obtained from the first argument of the system call by a specified operation thread ID detection unit 22, while the specified operation thread memory region ID is obtained from the third argument of the system call by a specified memory region ID detection unit 24, and the specified operation right to be added is obtained from the fourth argument of the system call by a specified operation right detection unit 25.

Then, at the step S15, according to the specified operation thread ID, the specified target thread ID, the specified operation thread memory region ID, and the specified operation right obtained at the steps S11 and S14, the operation right list in the operation right list memory unit 70 is rewritten by an operation right list changing unit 27. In other words, the operation right list is searched, and when there is a matching entry which matches with all three of the specified operation thread ID, the specified target thread ID, and the specified operation thread memory region ID, the thread operation right field of this matching entry is rewritten, whereas otherwise, a new entry for a set of the specified operation thread ID, the specified target thread ID, and the specified operation thread memory region ID is added to the operation right list. In the exemplary case, the matching entry can be found at the first entry of the operation right list shown in FIG. 15, so that the value for the thread execution stop/start right in the thread operation right field is changed from "x" (not allowed) to "○" (allowed).

Then, at the step S16, whether the result of the execution at the step S15 has been successful or not is judged. In a case it is judges as successful, next at the step S17, a success code is returned to the system call finishing unit 17, whereas otherwise, next at the step S18, a failure code is returned to the system call finishing unit 17.

When this processing at the "Thread_Add_Acl" execution unit 121 is finished, the system call finishing unit 17 finishes up the execution of the system call by carrying out a processing for returning a return value of the system call to the user program which executed this system call according to one of the error code, the success code, and the failure code which is received, a processing for restoring a status enabling the execution of the user program which called this system call and has been interrupted, and a processing for setting the execution level of the processor 2 back from the privileged level to the original user level.

Figure 18:
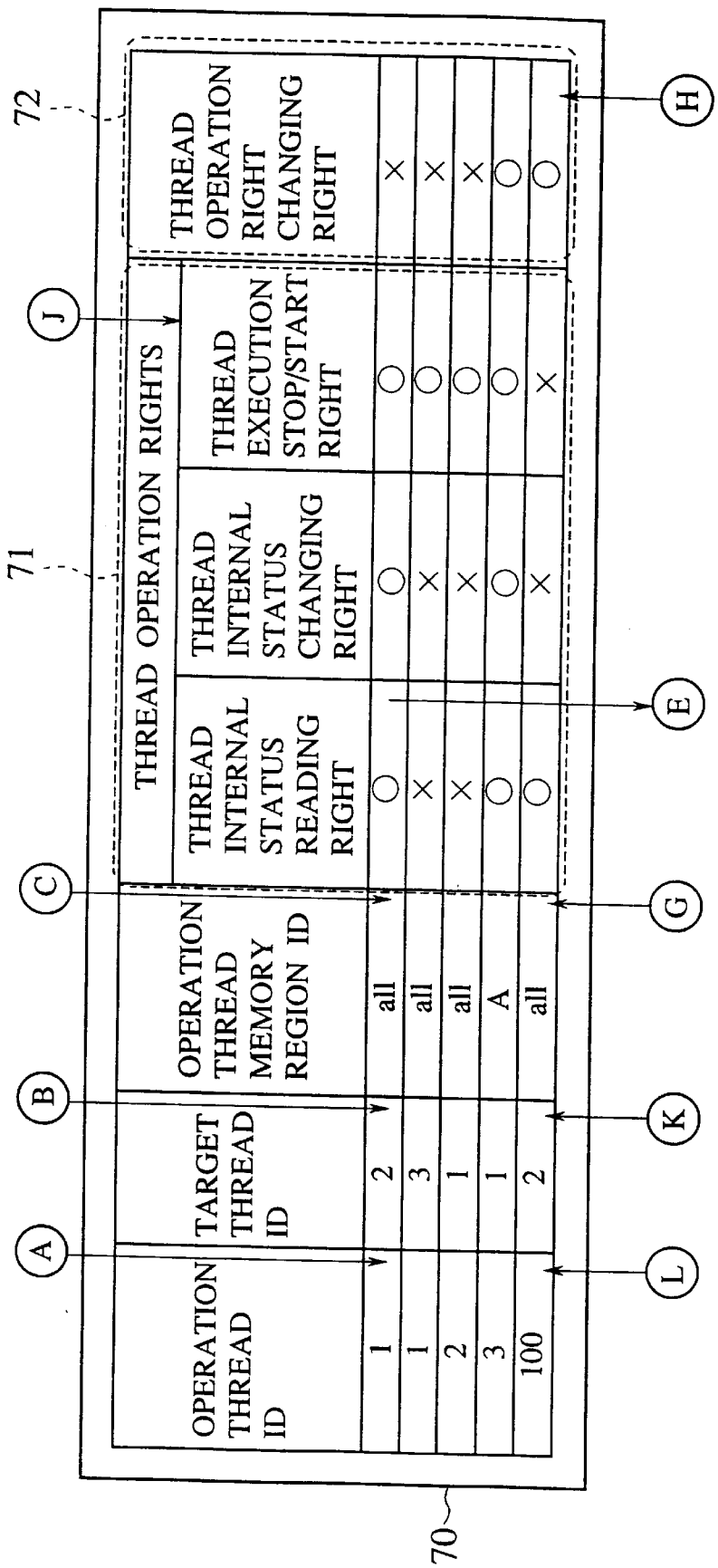
FIG. 18 is an illustration of the operation right list in the system of FIG. 16, which is obtained by the processing of FIG. 17 on the operation right list of FIG. 15 in one case.

As a result of the successful completion of this "Thread_Add_Acl" system call as in this exemplary case, the operation right list in the operation right list memory unit 70 is changed from that shown in FIG. 15 to that shown in FIG. 18.

Now, at the operation right list changing unit 27, depending on the contents of the arguments given to the "Thread_Add_Acl" system call, the operation right changing operation may not be completed by simply changing the corresponding operation right field alone as in the exemplary case described above, and it may be necessary to add a new entry to the operation right list in the operation right list memory unit 70.

As an example, a case of executing "Thread_Add_Acl (3, 2, A, Thread_Suspend*Thread_Get_Status) while the operation right list is in a state shown in FIG. 15 will be considered.

In this case, the first argument "3" indicates the specified operation thread ID of the thread-3 to which the new operation right is to be assigned, the second argument "2" indicates the specified target thread ID of the thread-2 which is a target of the thread operation managed by the new operation right, the third argument "A" indicates the specified operation thread memory region ID of the program-A such that the operation right changed by the execution of this system call is valid only during the execution of the program-A (memory region ID=A), and the fourth argument "Thread_Suspend" and "Thread_Get_Status" indicate the thread execution stop/start right and the thread internal status reading right as the specified operation rights to be added for the combination of the specified operation thread ID, specified target thread ID, and specified operation thread memory region ID which are specified by the first, second, and third arguments, respectively.

When this system call is issued, the operation right list changing unit 27 searches through the operation right list in the operation right list memory unit 70 for an entry matching with all three of the specified operation thread ID, the specified target thread ID, and the specified operation thread memory region ID. In this case, however, no matching entry can be found, so that the system call cannot be executed by simply rewriting one field in the operation right list, and therefore a new entry for a set of the specified operation thread ID, the specified target thread ID, and the specified operation thread memory region ID is added to the operation right list. When the execution of this system call is completed in such a procedure, the operation right list in the operation right list memory unit 70 is changed from that shown in FIG. 15 to that shown in FIG. 19 in which a new entry corresponding to this system call is added at a bottom of the operation right list.

In the fourth embodiment described above, who should be given the operation right changing right initially is not mentioned. In general, at a time of the activation of the OS, the initial operation right changing right is given to some privileged threads, and thereafter the rights are spread hierarchically.

However, a scheme requiring the setting of the operation right changing right for every thread at a time of the production of a thread may cause the increase of the labor for programming. For this reason, the prescribed default operation right changing right may be set up at a time of the production of a memory region or a thread. Here, there are choices for the default setting, the simplest one of which is to assign the operation right changing right to the thread which activated the target memory region or thread. This scheme is equivalent to the concept of the owner in the conventional OS, and can serve as a starting point for making a flexible operation right management according to the present invention.

Also, in the fourth embodiment described above, the specified operation right that can be specified as the fourth argument of the "Thread_Add_Acl" has no constraint, so that it is possible to specify the "Thread_Change-Acl" system call for changing the thread operation right changing right. Then, using the "Thread_Del_Acl" system call which is inverse of the "Thread_Add_Acl" system call, such as "Thread_Del_Acl (3, 1, A, Thread-Change_Acl)" for example, it is possible for the thread with the thread ID=3 to delete the thread operation right of the thread with the thread ID=1 from the memory region with the memory region ID=A. In this case, there is a possibility for producing a thread for which the operation right changing right cannot be changed forever, so that the OS for which such a situation can be problematic may prohibit the changing of the data in the operation right changing right field which makes it impossible to change the data of the operation right list any further. For instance, when the system call "Thread_Del_Acl (3, 1, A, Thread_Change_Acl)" is executed, there is no longer any thread which can change the thread operation right for the thread with the thread ID=1. Thus, the operation right list changing unit 27 may be made to detect the error whenever such a system call is executed, and the failure code is returned to the system call finishing unit 17 so as to prevent the changing of the data in the operation right list.

Also, the right for changing the operation right changing right may be treated as an independent entity by providing an operation right changing right management right field in the operation right list, so as to make the more accurate operation right management.

In addition, it may also be possible to prohibit the changing of the data in the operation right changing right management right field which makes it impossible to change the data of the operation right changing right any further.

It is also possible to replace the thread ID by the user ID. In this case, the thread ID used in the above embodiments will be replaced by a user ID, the thread ID register unit 6 in FIG. 1 needs to be replaced by the user ID register unit.

Moreover, the operation thread memory region ID used in the above embodiments may be changed to the program ID of the program executed by the operation thread. In this case, the memory region ID register unit in FIG. 1 needs to be replaced by the program ID register unit.

Next, the fifth embodiment of a program execution and operation right management system according to the present invention will be described in detail.

In this fifth embodiment, the fourth embodiment described above is modified such that the flexible management of the operation rights with respect to the memory regions and threads is realized by assigning the operation right changing right for freely adding or deleting the operation rights to the operation right list itself, rather than using the inflexible concept of the owner. Here, as an exemplary case for making an effective use of this scheme, the operation right management in a case of using an application for the cooperative work by a plurality of users will be described in detail.

In this case, suppose the user-A has produced a new thread-10 (thread ID=10) for the purpose of holding an electronic conference using computers. More specifically, the thread-10 has been produced by a thread-11 (thread ID=11) which is the login shell operated by the user-A. At this point, the data corresponding to the thread-10 produced by the thread-11 appears in the operation right list as shown in FIG. 20. In the following, only the pertinent portion of the operation right list will be shown in the drawings, and the remaining portion of the operation right list will be omitted.

As shown in FIG. 20, the thread-11 is allowed to read the internal status of the thread-10 and to change the thread operation right for the thread-10, but it is not allowed to change the internal status of the thread-10 or to stop/start the execution of the thread-10. In other words, the execution of the thread-10 already set in operation would not be obstructed erroneously by the thread-11. These initial settings are specified as the arguments of the system call for producing the thread.

The produced thread-10 executes the program for the electronic conference, and functions as an interface with respect to the user-A. Also, as a memory region for supporting the electronic conference, the thread-10 produces the memory region-30 (memory region ID=30).

The management of the operation rights concerning this memory region-30 is also made by using the operation right list as shown in FIG. 21 which is similar to that used for the thread operation right management. Here, however, the target thread ID, the thread operation right, the thread internal status reading right, the thread internal status changing right, the thread execution stop/start right, and the thread operation right changing right used in the thread operation right management described above are going to be the target memory region ID, the memory region operation right, the memory region internal data reading right, the memory region internal data changing right, the memory region program execution right, and the memory region operation right changing right in the memory region operation right management.

The operation right list shown in FIG. 21 indicates that thread-10 is allowed to read and change the internal data of the memory region-30 and to change the operation right of the memory region-30.

When the user-B and the user-C participate in this electronic conference, the thread-10 newly produces a thread-12 (thread ID=12) and a thread-13 (thread ID=13) for the user-B and the user-C. As a result, the operation right list of FIG. 20 is changed as shown in FIG. 22 in which the entries for the thread-12 and thread-13 produced by the thread-10 are added. Also, the memory region-30 for supporting the electronic conference is going to be used by these thread-12 and thread-13 as well, so that the operation right list of FIG. 21 is also changed as shown in FIG. 23 in which the entries for the thread-12 and thread-13 are added.

The operation right list of FIG. 22 indicates that the thread-12 and thread-13 are controlled by the thread-10, so that the thread-10 can make any operation concerning these thread-12 and thread-13, but these thread-12 and thread-13 are not allowed to control any other thread. In this manner, the thread-10 can lead the proceeding of the electronic conference as originally programmed.

The operation right list of FIG. 23 indicates that the internal data of the memory region-30 which is used as a common memory region can be read or changed by any of the thread-10, thread-12, and thread-13, but only the thread-10 is allowed to change the operation rights for this memory region-30.

In this manner, even a communication program such as that of the electronic conference which involves complicated dependency relationships can be described accurately by using the operation right management mechanism of the OS.

Next, a case in which the thread-10 of the user-A which had been leading the conference has left the conference in a middle while the conference is still continuing further will be considered.

In this case, if the thread-10 simply finishes its execution, there would be no thread capable of changing the operation rights of the memory region-30, so that the conference cannot be continued properly. In such a case, the user-A should hand over the right to lead the conference to the other participant of the conference such as the user-B for example.

To this end, first, the operation right changing right for the memory region-30 is set to the entry for the thread-12 in the operation right list for the memory region operation management. Then, the operation right changing right for the thread-13 is handed over to the thread-12 in the operation right list for the thread operation management, and then the execution of the thread-10 is finished. The other entries with the operation thread ID 10 are also automatically deleted when the execution of the thread-10 is finished.

In this manner, the operation right list of FIG. 22 is changed as shown in FIG. 24, while the operation right list of FIG. 23 is changed as shown in FIG. 25. Namely, the access to the memory region-30 can be made from both the thread-12 and the thread-13, but the right to manage the threads is succeeded by the thread-12. Here, it should be noted that, at this point, the thread-11 which was the login shell of the user-A does not have any right at all with respect to any of the programs for carrying out the electronic conference, as the execution of the thread-10 has been finished.

It is also to be noted that the procedure for handing over the operation right as described above is only an exemplary scheme for realizing the electronic conference program, and certainly not the only scheme for describing the program.

In this manner, it becomes possible to realize the changing of the managing person while managing the operation rights with respect to the threads and the memory regions.

Thus, according to this fifth embodiment, a rather ambiguous operation right management in a case of joining the conference or leaving the conference for example can be realized flexibly and surely under the support of the OS, without describing it meticulously in the application.

As described, according to the fourth and fifth embodiment of the present invention, not just the management of the thread operation rights but also the right for changing the operation rights can be flexibly expressed and managed by various combinations of conditions. As a result, it becomes possible to allow the changing of the thread operation rights only to a particular thread, and the thread operation rights can be expressed by the combination of a plurality of conditions.

In particular, in a case of producing a cooperative work application for the computer called groupware, it is required to be capable of easily describing the minute controls such as the sharing of the threads, the exclusive control, the protection from the other programs, etc., so that the present invention can be quite effective in such a case.

Also, it becomes possible to prevent the erroneous rewriting of the thread operation rights due to the program errors or the improper calling of the system calls, so that the reliability of the thread performance can be increased considerably even when the sharing of the threads is involved.

Similarly, according to the fourth and fifth embodiment of the present invention, not just the management of the memory region operation rights but also the right for changing the operation rights can be flexibly expressed and managed by various combinations of conditions. As a result, it becomes possible to allow the changing of the memory region operation rights only to a thread in a particular memory region, and the thread operation rights can be expressed by the combination of a plurality of conditions.

In particular, in a case of the recently developed OS using single virtual memory in which a plurality of applications operates on the same virtual space, it is required to be capable of easily describing the minute controls such as the sharing of the threads, the exclusive control, the protection from the other programs, etc., so that the present invention can be quite effective in such a case.

Also, it becomes possible to prevent the erroneous rewriting of the memory region operation rights due to the program errors or the improper calling of the system calls, so that the reliability of the data in the memory regions can be increased considerably even when the sharing of the memory regions is involved.

In addition, the operation rights and the operation right changing rights for the threads or the memory regions which have many common features in general are managed together in the same operation right list by sharing the common features so that data amount can be suppressed, and the common procedure can be used for the verification of both the operation rights and the operation right changing rights.

Furthermore, in a case of using a hardware called memory management unit for the purpose of the thread or memory region operation right management, the configuration of the computer hardware can be simplified by managing the operation rights and the operation right changing rights together, without requiring separate hardwares for the operation right management and the operation right changing right management which could complicate the computer configuration.

Thus, according to the present invention, it is possible to provide a program execution and operation right management system capable of providing flexible and sufficient protection uniformly, not just among the threads in different virtual spaces, but also for the thread operation instructions among the threads sharing the same virtual address space and/or for individual memory region.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A program execution and operation right management system, comprising:

at least one processor for executing programs by executing a plurality of threads concurrently;

a memory for storing operation right data indicating which operation thread among said plurality of threads is permitted to perform what type of thread operation with respect to which target thread among said plurality of threads; and management means for judging whether a thread operation with respect to one thread among said plurality of threads that is requested by another thread among said plurality of threads is allowed by checking whether the operation right data stored in the memory indicates that said another thread regarded as the operation thread is permitted to perform a type of said thread operation with respect to said one thread regarded as the target thread, and allowing the processor to carry out said thread operation with respect to said one thread by said another thread according to a result of the judging.

2. The system of claim 1, wherein:

the memory also stores time information specifying a valid period for the operation right data; and the management means makes a judgement by using only those operation right data in the valid period according to the time information.

3. The system of claim 1, wherein:

the programs to be executed by the processor are arranged on a logical address space divided into a plurality of memory regions; and the operation right data also indicates which thread can be operated by other threads among said plurality of threads in which memory region among said plurality of memory regions.

4. The system of claim 1, wherein:

the memory also stores operation right changing right data indicating which thread can change the operation right data of which thread among said plurality of threads; and the management means judges whether an operation right changing operation with respect to a particular thread requested by a different thread among said plurality of threads is allowed by the operation right changing right data stored by the memory, and allowing the processor to carry out said operation right changing operation with respect to said particular thread by said different thread only when it is judged that said operation right changing operation is allowed by the operation right changing right data.

5. The system of claim 4, wherein the memory stores the operation right changing right data in conjunction with the operation right data.

6. The system of claim 4, wherein the management means does not allow the processor to carry out said operation right changing operation with respect to said particular thread by said different thread when said operation right changing operation leaves no thread that can change the operation right data of other threads among said plurality of threads, even when it is judged that said operation right changing operation is allowed by the operation right changing right data.

7. A program execution and operation right management system, comprising:

at least one processor for executing programs by executing a plurality of threads concurrently, where the programs are arranged on a logical address space divided into a plurality of memory regions while thread data of each thread among said plurality of threads are stored in respective one of said plurality of memory regions;

memory access management means for storing access control list data indicating which operation thread among said plurality of threads is permitted to perform what type of memory access operation to which target memory region among said plurality of memory regions; and memory access control means for judging whether a memory access operation from a certain thread among said plurality of threads to a certain memory region among said plurality of memory regions is allowed by checking whether the access control list data stored by the memory access management means indicates that said certain thread regarded as the operation thread is permitted to perform a type of said memory access operation to said certain memory region regarded as the target memory regions, and allowing the processor to carry out said memory access operation from said certain thread to said certain memory region according to a result of the judging where said memory access operation corresponds to a thread operation requested by said certain thread with respect to another thread among said plurality of threads which corresponds to said certain memory region.

8. A program execution and operation right management system, comprising:

at least one processor for executing programs by executing a plurality of threads concurrently, where the programs are arranged on a logical address space divided into a plurality of memory regions;

a memory for storing memory region operation right data indicating which thread among said plurality of threads is permitted to make an access to which memory region among said plurality of memory regions, and memory region operation right changing right data indicating which operation thread among said plurality of threads is permitted to change the memory region operation right data of which memory region among said plurality of memory regions; and management means for judging whether a memory region operation right changing operation with respect to one memory region among said plurality of memory regions that is requested by one thread among said plurality of threads is allowed by checking whether the memory region operation right changing right data stored in the memory indicates that said one thread regarded as the operation thread is permitted to change the memory region operation right data of said one memory region regarded as the target memory region, and allowing the processor to carry out said memory region operation right changing operation with respect to said one memory region by said one thread according to a result of the judging.

9. The system of claim 8, wherein the memory stores the memory region operation right changing right data in conjunction with the memory region operation right data.

10. The system of claim 8, wherein the management means does not allow the processor to carry out said memory region operation right changing operation with respect to said one memory region by said one thread when said memory region operation right changing operation leaves no thread that can change the memory region operation right data of said plurality of memory regions, even when it is judged that said memory region operation right changing operation is allowed by the memory region operation right changing right data.

11. A method for managing program execution and operation right among a plurality of threads executed concurrently by at least one processor for executing programs, comprising the steps of:

storing operation right data indicating which operation thread among said plurality of threads is permitted to perform what type of thread operation with respect to which target thread among said plurality of threads; and judging whether a thread operation with respect to one thread among said plurality of threads that is requested by another thread among said plurality of threads is allowed by checking whether the operation right data stored at the storing step indicates that said another thread regarded as the operation thread is permitted to perform a type of said thread operation with respect to said one thread regarded as the target thread; and allowing the processor to carry out said thread operation with respect to said one thread by said another thread according to a result of the judging.

12. The method of claim 11, wherein:

the storing step also stores time information specifying a valid period for the operation right data; and the judging step makes a judgement by using only those operation right data in the valid period according to the time information.

13. The method of claim 11, wherein:

the programs to be executed by the processor are arranged on a logical address space divided into a plurality of memory regions; and the operation right data also indicates which thread can be operated by other threads among said plurality of threads in which memory region among said plurality of memory regions.

14. The method of claim 11, wherein:

the storing step also stores operation right changing right data indicating which thread can change the operation right data of which thread among said plurality of threads;

the judging step judges whether an operation right changing operation with respect to a particular thread requested by a different thread among said plurality of threads is allowed by the operation right changing right data stored by the storing step; and the allowing step allows the processor to carry out said operation right changing operation with respect to said particular thread by said different thread only when it is judged that said operation right changing operation is allowed by the operation right changing right data at the judging step.

15. The method of claim 14, wherein the storing step stores the operation right changing right data in conjunction with the operation right data.

16. The method of claim 14, wherein the allowing step does not allow the processor to carry out said operation right changing operation with respect to said particular thread by said different thread when said operation right changing operation leaves no thread that can change the operation right data of other threads among said plurality of threads, even when it is judged that said operation right changing operation is allowed by the operation right changing right data at the judging step.

17. A method for managing program execution and operation right among a plurality of threads executed concurrently by at least one processor for executing programs, comprising the steps of:

arranging the programs on a logical address space divided into a plurality of memory regions and storing thread data of each thread among said plurality of threads in respective one of said plurality of memory regions;

storing access control list data indicating which operation thread among said plurality of threads is permitted to perform what type of memory access operation to which target memory region among said plurality of memory regions;

judging whether a memory access operation from a certain thread among said plurality of threads to a certain memory region among said plurality of memory regions is allowed by checking whether the access control list data stored at the storing step indicates that said certain thread regarded as the operation thread is permitted to perform a type of said memory access operation to said certain memory region regarded as the target memory region; and allowing the processor to carry out said memory access operation from said certain thread to said certain memory region according to a result of the judging, where said memory access operation corresponds to a thread operation requested by said certain thread with respect to another thread among said plurality of threads which corresponds to said certain memory region.

18. A method for managing program execution and operation right among a plurality of memory regions of a logical address space storing programs to be executed by a plurality of threads executed by at least one processor, comprising the steps of:

storing memory region operation right data indicating which thread among said plurality threads is permitted to make an access to which memory region among said plurality of memory regions, and memory region operation right changing right data indicating which operation thread among said plurality of threads is permitted to change the memory region operation right data of which memory region among said plurality of memory regions;

judging whether a memory region operation right changing operation with respect to one memory region among said plurality of memory regions that is requested by one thread among said plurality of threads is allowed by checking whether the memory region operation right changing right data stored at the storing step indicates that said one thread regarded as the operation thread is permitted to change the region operation right data of said one memory region regarded as the target memory region; and allowing the processor to carry out said memory region operation right changing operation with respect to said one memory region by said one thread according to a result of the judging.

19. The method of claim 18, wherein the storing step stores the memory region operation right changing right data in conjunction with the memory region operation right data.

20. The method of claim 18, wherein the allowing step does not allow the processor to carry out said memory region operation right changing operation with respect to said one memory region by said one thread when said memory region operation right changing operation leaves no thread that can change the memory region operation right data of said plurality of memory regions, even when it is judged that said memory region operation right changing operation is allowed by the memory region operation right changing right data at the judging step.

* * * * *